(12) United States Patent
York et al.

(10) Patent No.: US 11,150,400 B2
(45) Date of Patent: Oct. 19, 2021

(54) ILLUMINATION DEVICE FOR DIRECT-INDIRECT ILLUMINATION

(71) Applicant: Quarkstar LLC, Las Vegas, NV (US)

(72) Inventors: Allan Brent York, Fort Langley (CA); Hans Peter Stormberg, Stolberg (DE); Louis Lerman, Las Vegas, NV (US); Ferdinand Schinagl, North Vancouver (CA); Wilson Dau, Victoria (CA)

(73) Assignee: Quarkstar LLC, Las Vegas, NV (US)

( * ) Notice: Subject to any disclaimer, the term of this patent is extended or adjusted under 35 U.S.C. 154(b) by 0 days.

(21) Appl. No.: 16/940,081

(22) Filed: Jul. 27, 2020

(65) Prior Publication Data

US 2021/0173138 A1 Jun. 10, 2021

Related U.S. Application Data

(63) Continuation of application No. 16/154,587, filed on Oct. 8, 2018, now Pat. No. 10,725,229, which is a
(Continued)

(51) Int. Cl.
*F21V 8/00* (2006.01)
*F21K 9/61* (2016.01)
(Continued)

(52) U.S. Cl.
CPC ............. *G02B 6/0055* (2013.01); *F21K 9/61* (2016.08); *F21S 8/026* (2013.01); *F21V 7/0016* (2013.01);
(Continued)

(58) Field of Classification Search
CPC .. G02B 6/0055; G02B 6/0023; G02B 6/0031; G02B 6/0035; G02B 6/0045;
(Continued)

(56) References Cited

U.S. PATENT DOCUMENTS 2,194,841 A 3/1940 Welch
2,626,120 A 1/1953 Baker
(Continued)

FOREIGN PATENT DOCUMENTS

CA 2702690 11/2010
CN 2200747 6/1995
(Continued)

OTHER PUBLICATIONS

Philips Lighting Company, "Philips EnduraLED Candle LED Lamps", Downloaded from the internet at: www.lighting.philips.com/us_en/browseliterature/download/p-6027 on Jan. 27, 2012, 2 pages (2010).
(Continued)

*Primary Examiner* — Andrew J Coughlin
*Assistant Examiner* — Jessica M Apenteng
(74) *Attorney, Agent, or Firm* — Fish & Richardson P.C.

(57) ABSTRACT

An illumination device includes a plurality of light-emitting elements (LEEs); a light guide extending in a forward direction from a first end to a second end to receive at the first end light emitted by the LEEs and to guide the received light to the second end; an optical extractor optically coupled to the second end to receive the guided light, the optical extractor including a redirecting surface to reflect a first portion of the guided light, the reflected light being output by the optical extractor in a backward angular range, and the redirecting surface having one or more transmissive portions to transmit a second portion of the guided light in the forward direction; and one or more optical elements optically coupled to the transmissive portions, the optical elements to modify the light transmitted through the transmissive portions and to output the modified light in a forward angular range.

18 Claims, 13 Drawing Sheets

Related U.S. Application Data continuation of application No. 15/605,875, filed on May 25, 2017, now Pat. No. 10,094,969, which is a continuation of application No. 14/422,851, filed as application No. PCT/US2014/056146 on Sep. 17, 2014, now Pat. No. 9,664,839.

(60) Provisional application No. 61/878,764, filed on Sep. 17, 2013.

(51) Int. Cl.
  *F21V 7/00* (2006.01)
  *G02B 19/00* (2006.01)
  *F21S 8/02* (2006.01)
  *F21Y 101/00* (2016.01)
  *F21Y 103/10* (2016.01)
  *F21Y 115/10* (2016.01)

(52) U.S. Cl.
  CPC ............ *F21V 7/0091* (2013.01); *G02B 6/005* (2013.01); *G02B 6/0023* (2013.01); *G02B 6/0031* (2013.01); *G02B 6/0035* (2013.01); *G02B 6/0045* (2013.01); *G02B 6/0046* (2013.01); *G02B 6/0085* (2013.01); *G02B 6/0096* (2013.01); *G02B 19/00* (2013.01); *F21Y 2101/00* (2013.01); *F21Y 2103/10* (2016.08); *F21Y 2115/10* (2016.08)

(58) Field of Classification Search
  CPC .... G02B 6/0046; G02B 6/005; G02B 6/0085; G02B 6/0096; G02B 19/00; F21K 9/61; F21S 8/026; F21V 7/0016; F21V 7/0091; F21Y 2103/10; F21Y 2115/10; F21Y 2101/00
  See application file for complete search history.

(56) References Cited

U.S. PATENT DOCUMENTS

| | | |
|---|---|---|
| 3,772,506 A | 11/1973 | Junginger |
| 3,836,767 A | 9/1974 | Lasker |
| 4,112,483 A | 9/1978 | Small et al. |
| 4,240,692 A | 12/1980 | Winston |
| 4,254,456 A | 3/1981 | Grindle et al. |
| 4,271,408 A | 6/1981 | Teshima et al. |
| 4,358,817 A | 11/1982 | Bielemeier |
| 5,134,550 A | 7/1992 | Young |
| 5,289,356 A | 2/1994 | Winston |
| 5,436,805 A | 7/1995 | Hsu et al. |
| 5,438,485 A | 8/1995 | Li et al. |
| 5,448,460 A | 9/1995 | Belfer et al. |
| 5,581,683 A | 12/1996 | Bertignoll et al. |
| 5,810,463 A | 9/1998 | Kawahara et al. |
| 5,868,489 A | 2/1999 | Fuller et al. |
| 5,988,836 A | 11/1999 | Sawarens |
| 6,058,271 A | 5/2000 | Tenmyo |
| 6,186,642 B1 | 2/2001 | Corcorran et al. |
| 6,234,643 B1 | 5/2001 | Lichon |
| 6,241,369 B1 | 6/2001 | Mackiewicz |
| 6,250,019 B1 | 6/2001 | Simons |
| 6,273,577 B1 | 8/2001 | Goto et al. |
| 6,280,052 B1 | 8/2001 | White |
| 6,350,041 B1 | 2/2002 | Tarsa et al. |
| 6,441,943 B1 | 8/2002 | Roberts et al. |
| 6,505,953 B1 | 1/2003 | Dahlen |
| 6,527,420 B1 | 3/2003 | Chuang |
| 6,540,373 B2 | 4/2003 | Bailey |
| 6,543,911 B1 | 4/2003 | Rizkin et al. |
| 6,572,246 B1 | 6/2003 | Hopp et al. |
| 6,598,998 B2 | 7/2003 | West et al. |
| 6,834,979 B1 | 12/2004 | Cleaver et al. |
| 6,880,963 B2 | 4/2005 | Luig et al. |
| 6,932,499 B2 | 8/2005 | Ogura |
| 6,948,828 B1 | 9/2005 | Chambers |
| 6,948,840 B2 | 9/2005 | Grenda et al. |
| 7,083,315 B2 | 8/2006 | Hansler et al. |
| 7,097,337 B2 | 8/2006 | Kim et al. |
| 7,134,768 B2 | 11/2006 | Suzuki |
| 7,156,540 B2 | 1/2007 | Haines |
| 7,164,842 B2 | 1/2007 | Chen |
| 7,182,480 B2 | 2/2007 | Kan |
| 7,259,403 B2 | 8/2007 | Shimizu et al. |
| 7,275,841 B2 | 10/2007 | Kelly |
| 7,286,296 B2 | 10/2007 | Chaves et al. |
| 7,290,906 B2 | 11/2007 | Suzuki et al. |
| 7,293,889 B2 | 11/2007 | Kamiya |
| 7,331,691 B2 | 2/2008 | Livesay et al. |
| 7,334,932 B2 | 2/2008 | Klettke |
| 7,341,358 B2 | 3/2008 | Hsieh et al. |
| 7,375,382 B2 | 5/2008 | Tessnow |
| 7,386,214 B1 | 6/2008 | Canciotto |
| 7,387,399 B2 | 6/2008 | Noh et al. |
| 7,434,951 B2 | 10/2008 | Bienick |
| 7,530,712 B2 | 5/2009 | Lin et al. |
| 7,645,054 B2 | 1/2010 | Goihl |
| 7,837,370 B2 | 11/2010 | Bierhuizen |
| 7,850,347 B2 | 12/2010 | Speier et al. |
| 7,855,815 B2 | 12/2010 | Hayashide |
| 7,942,546 B2 | 5/2011 | Naijo et al. |
| 7,942,565 B2 | 5/2011 | Klick et al. |
| 7,947,915 B2 | 5/2011 | Lee et al. |
| 7,967,477 B2 | 6/2011 | Bloemen et al. |
| 8,002,446 B1 | 8/2011 | Plunk et al. |
| 8,006,453 B2 | 8/2011 | Anderson |
| 8,042,968 B2 | 10/2011 | Boyer et al. |
| 8,061,867 B2 | 11/2011 | Kim et al. |
| 8,068,707 B1 | 11/2011 | Simon |
| 8,075,147 B2 | 12/2011 | Chaves et al. |
| 8,192,051 B2 | 6/2012 | Dau et al. |
| 8,277,106 B2 | 10/2012 | Van Gorkom |
| 8,348,489 B2 | 1/2013 | Holman et al. |
| 8,506,112 B1 | 8/2013 | Dau et al. |
| 8,556,452 B2 | 10/2013 | Simon |
| 8,573,823 B2 | 11/2013 | Dau et al. |
| 8,602,586 B1 | 12/2013 | Dau et al. |
| 8,696,184 B2 | 4/2014 | Morino |
| 8,740,407 B2 | 6/2014 | Kotovsky et al. |
| 8,833,969 B2 | 9/2014 | Speier et al. |
| 8,833,996 B2 | 9/2014 | Dau et al. |
| 8,899,808 B2 | 12/2014 | Speier |
| 8,960,980 B2 | 2/2015 | Tsai |
| 9,028,120 B2 | 5/2015 | Dau |
| 9,519,095 B2 | 12/2016 | Wilcox |
| 9,625,636 B2 | 4/2017 | Durkee |
| 2003/0117798 A1 | 6/2003 | Leysath |
| 2004/0012976 A1 | 1/2004 | Amano |
| 2004/0070969 A1 | 4/2004 | Ward |
| 2004/0080947 A1 | 4/2004 | Subisak et al. |
| 2004/0105264 A1 | 6/2004 | Spero |
| 2004/0120160 A1 | 6/2004 | Natsume |
| 2004/0137189 A1 | 7/2004 | Tellini et al. |
| 2004/0208019 A1 | 10/2004 | Koizumi |
| 2004/0228131 A1 | 11/2004 | Minano et al. |
| 2004/0257803 A1 | 12/2004 | Kermoade |
| 2005/0057922 A1 | 3/2005 | Herst et al. |
| 2005/0063169 A1 | 3/2005 | Erber |
| 2005/0111235 A1 | 5/2005 | Suzuki et al. |
| 2005/0185416 A1 | 8/2005 | Lee et al. |
| 2005/0201102 A1 | 9/2005 | Saccomanno et al. |
| 2005/0207177 A1 | 9/2005 | Guy |
| 2005/0243570 A1 | 11/2005 | Chaves et al. |
| 2005/0253526 A1 | 11/2005 | Shibahara |
| 2005/0265044 A1 | 12/2005 | Chen et al. |
| 2005/0270774 A1 | 12/2005 | Pan |
| 2005/0276566 A1 | 12/2005 | Iimura |
| 2006/0002131 A1 | 1/2006 | Schultz |
| 2006/0002678 A1 | 1/2006 | Weber et al. |
| 2006/0061990 A1 | 3/2006 | Chinniah et al. |
| 2006/0076568 A1 | 4/2006 | Keller et al. |
| 2006/0098444 A1 | 5/2006 | Petruzzi |
| 2006/0139917 A1 | 6/2006 | Ward |
| 2006/0164839 A1 | 7/2006 | Stefanov |

(56) References Cited

U.S. PATENT DOCUMENTS

| | | |
|---|---|---|
| 2006/0187661 A1 | 8/2006 | Holten |
| 2007/0047228 A1 | 3/2007 | Thompson |
| 2007/0061360 A1 | 3/2007 | Holcombe |
| 2007/0081360 A1 | 4/2007 | Bailey |
| 2007/0097696 A1 | 5/2007 | Eng et al. |
| 2007/0201234 A1 | 8/2007 | Ottermann |
| 2007/0280593 A1 | 12/2007 | Brychell et al. |
| 2008/0074752 A1 | 3/2008 | Chaves et al. |
| 2008/0080166 A1 | 4/2008 | Duong et al. |
| 2008/0123367 A1 | 5/2008 | Pan et al. |
| 2008/0170398 A1 | 7/2008 | Kim |
| 2008/0192458 A1 | 8/2008 | Li |
| 2008/0198603 A1 | 8/2008 | Sormani et al. |
| 2008/0210154 A1 | 9/2008 | Nakano et al. |
| 2009/0027588 A1 | 1/2009 | Medendorp |
| 2009/0103293 A1 | 4/2009 | Harbers et al. |
| 2009/0168395 A1 | 7/2009 | Mrakovich |
| 2009/0201698 A1 | 8/2009 | Klick et al. |
| 2009/0231831 A1 | 9/2009 | Hsiao |
| 2009/0231878 A1 | 9/2009 | Van Duijneveldt |
| 2009/0316414 A1 | 12/2009 | Yang |
| 2010/0085773 A1 | 4/2010 | Richardson |
| 2010/0208456 A1 | 8/2010 | Huang |
| 2010/0220497 A1 | 9/2010 | Ngai |
| 2010/0246158 A1 | 9/2010 | VanGorkom |
| 2010/0302799 A1 | 12/2010 | Rosberg et al. |
| 2011/0001901 A1 | 1/2011 | Solomon |
| 2011/0043132 A1 | 2/2011 | Kim et al. |
| 2011/0063870 A1 | 3/2011 | Nomoto et al. |
| 2011/0103067 A1 | 5/2011 | Ago et al. |
| 2011/0164398 A1 | 7/2011 | Holten et al. |
| 2011/0164421 A1 | 7/2011 | Velazquez |
| 2011/0175533 A1 | 7/2011 | Holman et al. |
| 2011/0182084 A1 | 7/2011 | Tomlinson |
| 2011/0199005 A1 | 8/2011 | Bretschneider |
| 2011/0227487 A1 | 9/2011 | Nichol et al. |
| 2011/0234121 A1 | 9/2011 | Ding et al. |
| 2011/0235318 A1 | 9/2011 | Simon |
| 2011/0267836 A1 | 11/2011 | Boonekamp |
| 2011/0273900 A1 | 11/2011 | Li et al. |
| 2011/0286200 A1 | 11/2011 | Iimura |
| 2012/0020066 A1 | 1/2012 | Chang |
| 2012/0026751 A1 | 2/2012 | Lin et al. |
| 2012/0044675 A1 | 2/2012 | Buelow et al. |
| 2012/0069595 A1 | 3/2012 | Catalano |
| 2012/0069600 A1 | 3/2012 | Lin |
| 2012/0099310 A1 | 4/2012 | Kropac et al. |
| 2012/0147621 A1 | 6/2012 | Holten |
| 2012/0147624 A1 | 6/2012 | Li et al. |
| 2012/0155110 A1 | 6/2012 | Pijlman et al. |
| 2012/0155116 A1 | 6/2012 | Gardner |
| 2012/0170260 A1 | 7/2012 | Gardner |
| 2012/0236586 A1 | 9/2012 | Wang |
| 2012/0250346 A1 | 10/2012 | Williams |
| 2012/0268966 A1 | 10/2012 | McCollum et al. |
| 2012/0281432 A1 | 11/2012 | Parker et al. |
| 2012/0287633 A1 | 11/2012 | Kelly |
| 2012/0294037 A1 | 11/2012 | Holman et al. |
| 2012/0328242 A1 | 12/2012 | Hesse |
| 2013/0039050 A1 | 2/2013 | Dau et al. |
| 2013/0039090 A1 | 2/2013 | Dau et al. |
| 2013/0083555 A1 | 4/2013 | Chen et al. |
| 2013/0201715 A1 | 8/2013 | Dau et al. |
| 2013/0208495 A1 | 8/2013 | Dau et al. |
| 2013/0258699 A1 | 10/2013 | Weaver |
| 2013/0272015 A1 | 10/2013 | Weaver |
| 2013/0308338 A1 | 11/2013 | Lin et al. |
| 2014/0104868 A1 | 4/2014 | Speier et al. |
| 2014/0126235 A1 | 5/2014 | Speier et al. |
| 2014/0160779 A1 | 6/2014 | Pusch et al. |
| 2014/0192558 A1 | 7/2014 | Dau et al. |
| 2014/0226360 A1 | 8/2014 | Krijn |

FOREIGN PATENT DOCUMENTS

| | | |
|---|---|---|
| CN | 201203056 | 3/2009 |
| CN | 101501392 | 8/2009 |
| CN | 102282416 | 12/2011 |
| CN | 102576118 | 7/2012 |
| DE | 19917401 | 10/2000 |
| DE | 102011001769 | 10/2012 |
| DE | 102012107437 | 6/2014 |
| DE | 102013211868 | 12/2014 |
| EP | 1182395 | 2/2002 |
| EP | 1744096 | 1/2007 |
| EP | 2161494 | 3/2010 |
| EP | 2163701 | 3/2010 |
| EP | 2196725 | 6/2010 |
| EP | 2264359 | 12/2010 |
| EP | 2327340 | 6/2011 |
| EP | 2439564 | 4/2012 |
| EP | 2778512 | 9/2014 |
| EP | 2886937 | 6/2015 |
| FR | 2784739 | 4/2000 |
| FR | 2934353 | 1/2010 |
| JP | 2014229510 | 12/2014 |
| KR | 20110033699 | 3/2011 |
| WO | WO2001007828 | 2/2001 |
| WO | WO2003009012 | 1/2003 |
| WO | WO2005073629 | 8/2005 |
| WO | WO2005090854 | 9/2005 |
| WO | WO2006064434 | 6/2006 |
| WO | WO2007146373 | 12/2007 |
| WO | WO2008007315 | 1/2008 |
| WO | WO2008017968 | 2/2008 |
| WO | WO2008047278 | 4/2008 |
| WO | WO2008139383 | 11/2008 |
| WO | WO2009099547 | 8/2009 |
| WO | WO2009105168 | 8/2009 |
| WO | WO2010042423 | 4/2010 |
| WO | WO2010079391 | 7/2010 |
| WO | WO2010103450 | 9/2010 |
| WO | WO2010113091 | 10/2010 |
| WO | WO2011112914 | 9/2011 |
| WO | WO2012024607 | 2/2012 |
| WO | WO2012059852 | 5/2012 |
| WO | WO2012093126 | 7/2012 |
| WO | WO2012105314 | 8/2012 |
| WO | WO2012131560 | 10/2012 |
| WO | WO2012176352 | 12/2012 |
| WO | WO2013023008 | 2/2013 |
| WO | WO2013066822 | 5/2013 |
| WO | WO2013154835 | 10/2013 |
| WO | WO2015113979 | 8/2015 |

OTHER PUBLICATIONS http://www.everlight.com/datasheets/OL-Flat_Series_Data_Sheet_v5.pdf, "Datasheet: Office Lighting Flat Luminaire Series", product catalog, Everlight, Issue No. DBM-0000054_v5, May 5, 2011, pp. 1-5.

International Search Report and Written Opinion in International Application No. PCT/US2014/056146, dated Dec. 8, 2014, 12 pages.

International Application No. PCT/US2015/059513, Notification of Transmittal of the International Search Report and the Written Opinion of the International Searching Authority, dated Mar. 31, 2016, 21 pages.

European Patent Application No. 13837454, Communication pursuant to Rule 164(1) EPC, Partial Supplementary European Search Report, dated Jun. 1, 2016, 8 pages.

Chinese Patent Application No. 201380051544.4, Notification of First Office Action, dated Mar. 17, 2016, 8 pages.

European Patent Application No. 13873705.1, Supplementary European Search Report, dated Jul. 11, 2016, 4 pages.

European Patent Application No. 13873705.1, Communication pursuant to Article 94(3) EPC, dated Aug. 19, 2016, 10 pages.

European Application No. 17188348.1, European Search Report dated Dec. 8, 2017, 6 pages.

(56) References Cited

OTHER PUBLICATIONS

European Application No. 17188348.1, Communication pursuant to Article 94(3) dated Dec. 21, 2017, 7 pages.

SECTION A-A'

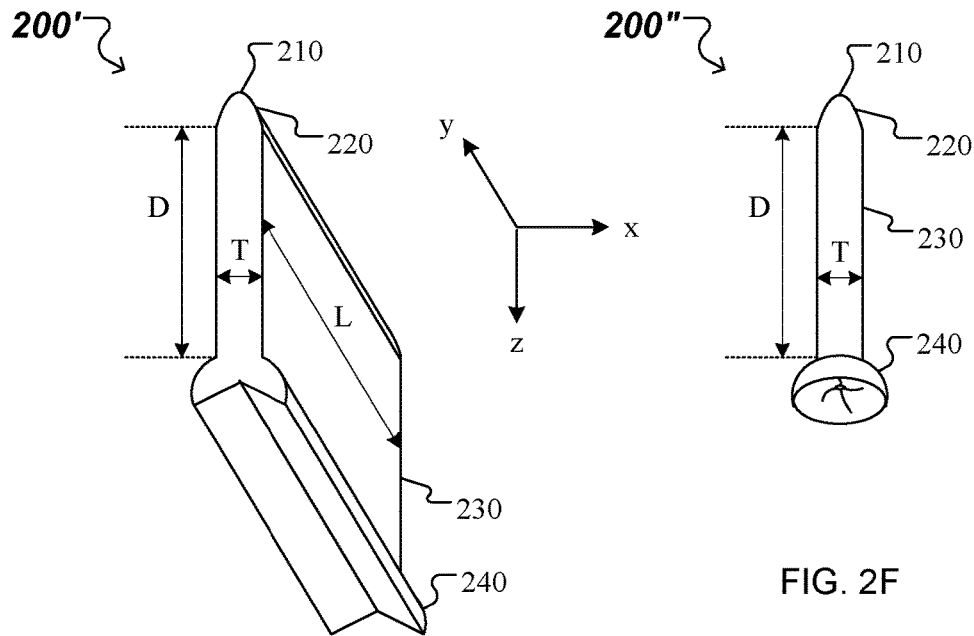
FIG. 2E
FIG. 2F
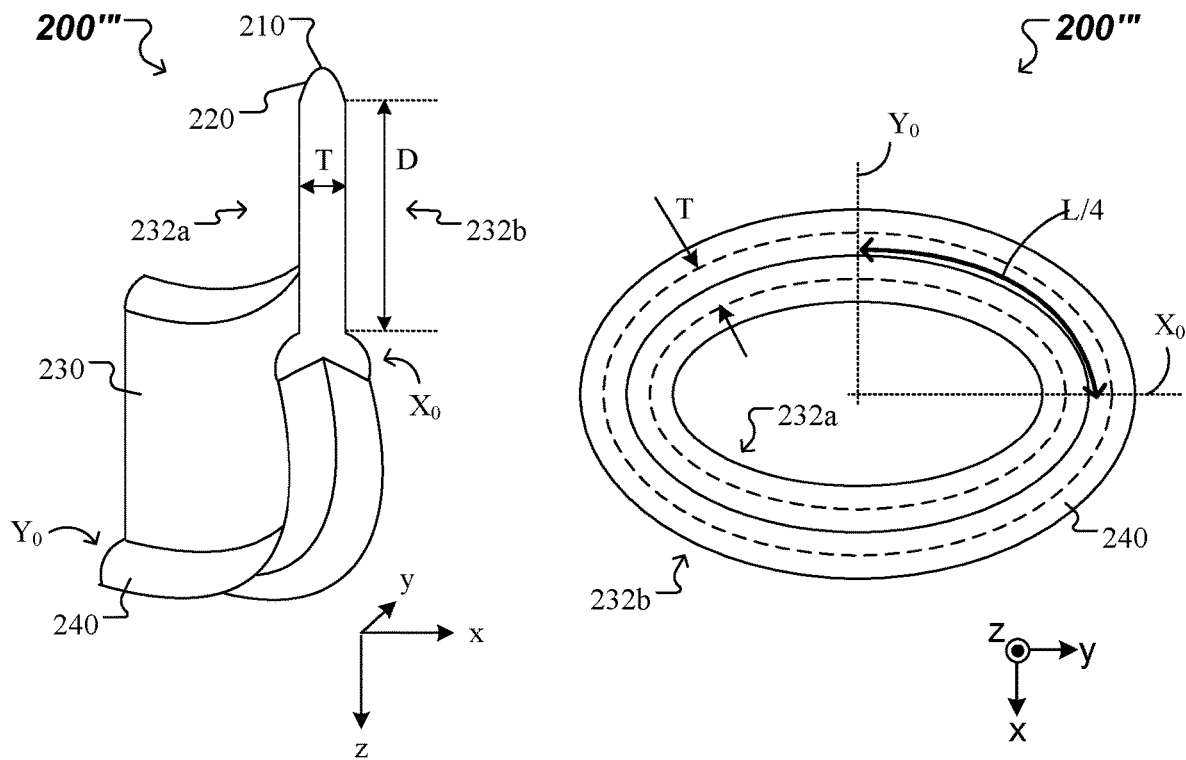
FIG. 2G
FIG. 2H

ILLUMINATION DEVICE FOR DIRECT-INDIRECT ILLUMINATION

CROSS-REFERENCE TO RELATED APPLICATIONS

This application is a continuation application of and claims priority to U.S. application Ser. No. 16/154,587, filed Oct. 8, 2018, which is a continuation of U.S. application Ser. No. 15/605,875, filed May 25, 2017, which is a continuation of U.S. application Ser. No. 14/422,851, filed Feb. 20, 2015 and issued on May 30, 2017 at U.S. Pat. No. 9,664,839, which is a U.S. National Stage of International Application No. PCT/US2014/056146, filed Sep. 17, 2014, which claims benefit under 35 U.S.C. § 119(e)(1) of U.S. Provisional Application No. 61/878,764, filed on Sep. 17, 2013, which are incorporated by reference herein.

TECHNICAL FIELD

The present disclosure relates generally to solid state-based illumination devices, for example to illumination devices including (i) an optical extractor with a redirecting surface having transmissive portions that transmit guided light incident thereon and (ii) optical elements coupled to the transmissive portions to modify a spectral or intensity distribution of the transmitted light.

BACKGROUND

Light sources are used in a variety of applications, such as providing general illumination and providing light for electronic displays (e.g., LCDs). Historically, incandescent light sources have been widely used for general illumination purposes. Incandescent light sources produce light by heating a filament wire to a high temperature until it glows. The hot filament is protected from oxidation in the air with a glass enclosure that is filled with inert gas or evacuated. Incandescent light sources are gradually being replaced in many applications by other types of electric lights, such as fluorescent lamps, compact fluorescent lamps (CFL), cold cathode fluorescent lamps (CCFL), high-intensity discharge lamps, and solid state light sources, such as light-emitting diodes (LEDs).

SUMMARY

The present disclosure relates to illumination devices that include (i) an optical extractor with a redirecting surface having transmissive portions that transmit guided light incident thereon and (ii) optical elements coupled to the transmissive portions to modify a spectral or intensity distribution of the transmitted light.

In general, innovative aspects of the technologies described herein can be implemented in an illumination device that includes one or more of the following aspects:

In a first aspect, an illumination device includes a plurality of light-emitting elements (LEEs); a light guide extending in a forward direction from a first end of the light guide to a second end of the light guide, the light guide being positioned to receive at the first end light emitted by the LEEs and configured to guide the received light to the second end; an optical extractor optically coupled to the light guide at the second end to receive the guided light, the optical extractor including a redirecting surface to reflect a first portion of the guided light, where the reflected light is output by the optical extractor to the ambient environment in a backward angular range, and where the redirecting surface has one or more transmissive portions to transmit a second portion of the guided light in the forward direction; and one or more optical elements optically coupled to the one or more transmissive portions of the redirecting surface, the one or more optical elements to modify the light transmitted through the transmissive portions and to output the modified light to the ambient environment in a forward angular range.

In a second aspect, an illumination device includes a plurality of light-emitting elements (LEEs); one or more optical couplers extending in a forward direction, the optical couplers positioned to receive light emitted by the LEEs and configured to collimate the received light such that the collimated light provided by the one or more optical couplers has a first divergence; an optical extractor spaced apart from the one or more optical couplers at a first distance, the optical extractor including a redirecting surface to reflect a first portion of the collimated light to the ambient environment in a backward angular range, where the redirecting surface has one or more transmissive portions to transmit a second portion of the collimated light in the forward direction; and one or more optical elements optically coupled to the one or more transmissive portions of the redirecting surface, the one or more optical elements to modify the light transmitted through the transmissive portions and to output the modified light to the ambient environment in a forward angular range.

The foregoing and other embodiments can each optionally include one or more of the following features, alone or in combination. In some implementations, the light transmitted through the transmissive portions has a first spectral distribution, and the one or more optical elements can include inelastic scattering elements configured to modify the first spectral distribution of the transmitted light such that the output modified light has a second spectral distribution different from the first spectral distribution. Here, the second spectral distribution can have a larger weight at longer wavelengths than the first spectral distribution.

In some implementations, the one or more optical elements can include elastic scattering elements. In some implementations, the one or more optical elements can include lenses.

In some implementations, the transmissive portions of the redirecting surface can be arranged perpendicular to the forward direction, and the optical elements can be identical, such that each optical element modifies a propagation direction and a divergence of the output modified light in the same manner. In some implementations, the transmissive portions of the redirecting surface can be arranged perpendicular to the forward direction, and the optical elements can be different from each other, such that each optical element modifies at least an associated propagation direction or an associated divergence of the output modified light in a different manner relative to adjacent optical elements.

In some implementations, the redirecting surface can be coated with a film of reflective material, and the transmissive portions of the redirecting surface can be apertures in the film of reflective material. Here, the one or more optical elements can be at least partially recessed into the one or more apertures.

In some implementations, the one or more optical elements can be disposed adjacent the one or more transmissive portions of the redirecting surface. In some implementations, the redirecting surface can reflect the first portion of the guided light via TIR and the one or more optical elements are configured to frustrate TIR to form the transmissive portions. In either of these implementations, the corresponding one or more optical elements can be bonded to the transmissive portions of the redirecting surface.

In some implementations, the optical extractor can include a curved output surface arranged to transmit the light reflected by the redirecting surface to the ambient in the backward angular range. Here, the redirecting surface reflects the first portion of the guided or collimated light in a first angular range having a direction with a component antiparallel to the forward direction and a first component orthogonal to the forward direction. Further, a second portion of the redirecting surface is arranged and shaped to reflect guided or collimated light in a second angular range having a direction with a component antiparallel to the forward direction and antiparallel to the first component of the first angular range. In some of the above cases, the optical extractor further includes a second curved output surface to transmit the light reflected by the second portion of the redirecting surface to the ambient environment in another backward angular range. Also, the transmissive portions of the redirecting surface can be distributed perpendicular to the direction of the first angular range.

In some implementations, the light guide and the optical extractor can be bonded together or integrally formed. In some implementations, the light guide and/or the optical extractor can be formed from a transparent, solid material. In some implementations, the light guide can be configured to guide the received light to the second end via total internal reflection (TIR). In some implementations, the disclosed luminaire module can include one or more optical couplers. Here, the light provided by the LEEs is in an emission angular range, and the optical couplers are arranged to receive the light provided by the LEEs and redirect it to the first end of the light guide where it has a collimated angular range. Moreover, a numerical aperture of the light guide can be such that the light received from the optical couplers in the collimated angular range can be guided by the light guide through TIR. In some implementations, the light guide can have two parallel side surfaces.

In some implementations, a combination of the first divergence and the first distance is configured such that the optical extractor receives all the collimated light. In some implementations, each of the one or more couplers can have a side surface extending between and input aperture and an exit aperture, and is configured to collimate the received light via TIR at the side surface.

In some implementations, the disclosed luminaire module can extend orthogonally to the forward direction. Here, the LEEs can be arranged orthogonally to the forward direction. In some implementations, the LEEs can be LEDs that emit white light.

In a third aspect, an illumination device includes a plurality of light-emitting elements (LEEs); a light guide extending in a forward direction from a first end of the light guide to a second end of the light guide, the light guide being positioned to receive at the first end light emitted by the LEEs and configured to guide the received light to the second end via total internal reflection (TIR); an optical extractor optically coupled to the light guide at the second end to receive the guided light, the optical extractor being formed from a transparent, solid material and including (i) a first set of reflective surfaces to reflect a first portion of the guided light, (ii) a first set of transmissive surfaces to transmit a second portion of the guided light to an ambient environment in the forward direction, the reflective surfaces being separated by the transmissive surfaces, and (iii) a curved output surface arranged to transmit the light reflected by the reflective surfaces to the ambient environment in a backward direction. Here, the transmissive surfaces are shaped such that each transmissive surface modifies at least an associated propagation direction or an associated divergence of the forward transmitted light in a different manner relative to adjacent transmissive surfaces.

The foregoing and other embodiments can each optionally include one or more of the following features, alone or in combination. In some implementations, the reflective surfaces are portions of an interface between the optical extractor and the ambient environment that can be coated with a film of reflective material, and the transmissive surfaces are remaining portions of the interface between the optical extractor and the ambient environment that are uncoated.

In some implementations, at least one of the transmissive surfaces can be flat. In some implementations, at least one of the transmissive surfaces can be curved. In some implementations, adjacent transmissive and reflective surfaces can intersect with common surface slope.

In some implementations, the first set of reflective surfaces can reflect guided light in a first angular range with a component antiparallel to the forward direction and a first component orthogonal to the forward direction. Here, the optical extractor further can include a second set of reflective surfaces to reflect guided light in a second angular range with a component antiparallel to the forward direction and antiparallel to the first component of the first angular range, and the optical extractor further includes a second curved output surface to transmit the light reflected by the second set of reflective surfaces to the ambient environment in another backward angular range. In either of these implementations the transmissive surfaces can be distributed laterally perpendicular to the direction of the first angular range.

In some implementations, the light guide and the optical extractor can be bonded together or integrally formed. In some implementations, the disclosed luminaire module further can include one or more optical couplers. Here, the light provided by the LEEs is in an emission angular range, the optical couplers are arranged to receive the light provided by the LEEs and redirect it to the first end of the light guide a collimated angular range, and a numerical aperture of the light guide is such that the light received from the optical couplers in the collimated angular range can be guided by the light guide through TIR.

In some implementations, the light guide has two parallel side surfaces. In some implementations, the disclosed luminaire module can extend orthogonally to the forward direction. Here, the LEEs can be arranged orthogonally to the forward direction. In some implementations, the LEEs can be LEDs that emit white light.

The details of one or more implementations of the technologies described herein are set forth in the accompanying drawings and the description below. Other features, aspects, and advantages of the disclosed technologies will become apparent from the description, the drawings, and the claims.

BRIEF DESCRIPTION OF THE DRAWINGS

FIGS. 2A-2J show aspects of luminaire modules that include an optical extractor with a redirecting surface having light transmitting portions without optical elements coupled with the light transmitting portions to modify the transmitted light.

Reference numbers and designations in the various drawings indicate exemplary aspects, implementations of particular features of the present disclosure.

DETAILED DESCRIPTION

The present disclosure relates to illumination devices for providing direct and/or indirect illumination. The disclosed illumination devices can efficiently guide and distribute light emitted by solid-state light sources towards work surfaces and/or towards background regions. Various luminous surfaces of the disclosed illumination devices and their respective intensity vectors can be manipulated within an illuminated environment to provide good utility of the light distribution output by the disclosed illumination devices. The present technology can harness the collective output of a plurality of solid-state light sources and create a virtual light source with unique properties that can result in compact luminaires with a small physical footprint relative to the illuminated environment.

Here, the light from the solid-state light sources is received at an optical extractor with a redirecting surface having transmissive portions that transmit guided light incident thereon. The redirecting surface reflects the guided light incident outside the transmissive portions, such that the light reflected by the redirecting surface is directed towards the background regions. The light transmitted through the transmissive portions is modified by optical elements coupled to the transmissive portions, such that a spectral or intensity distribution of the modified light is different from the corresponding distribution of the guided light. Moreover, the light modified in this manner is directed towards the work surfaces.

Figure 1A:
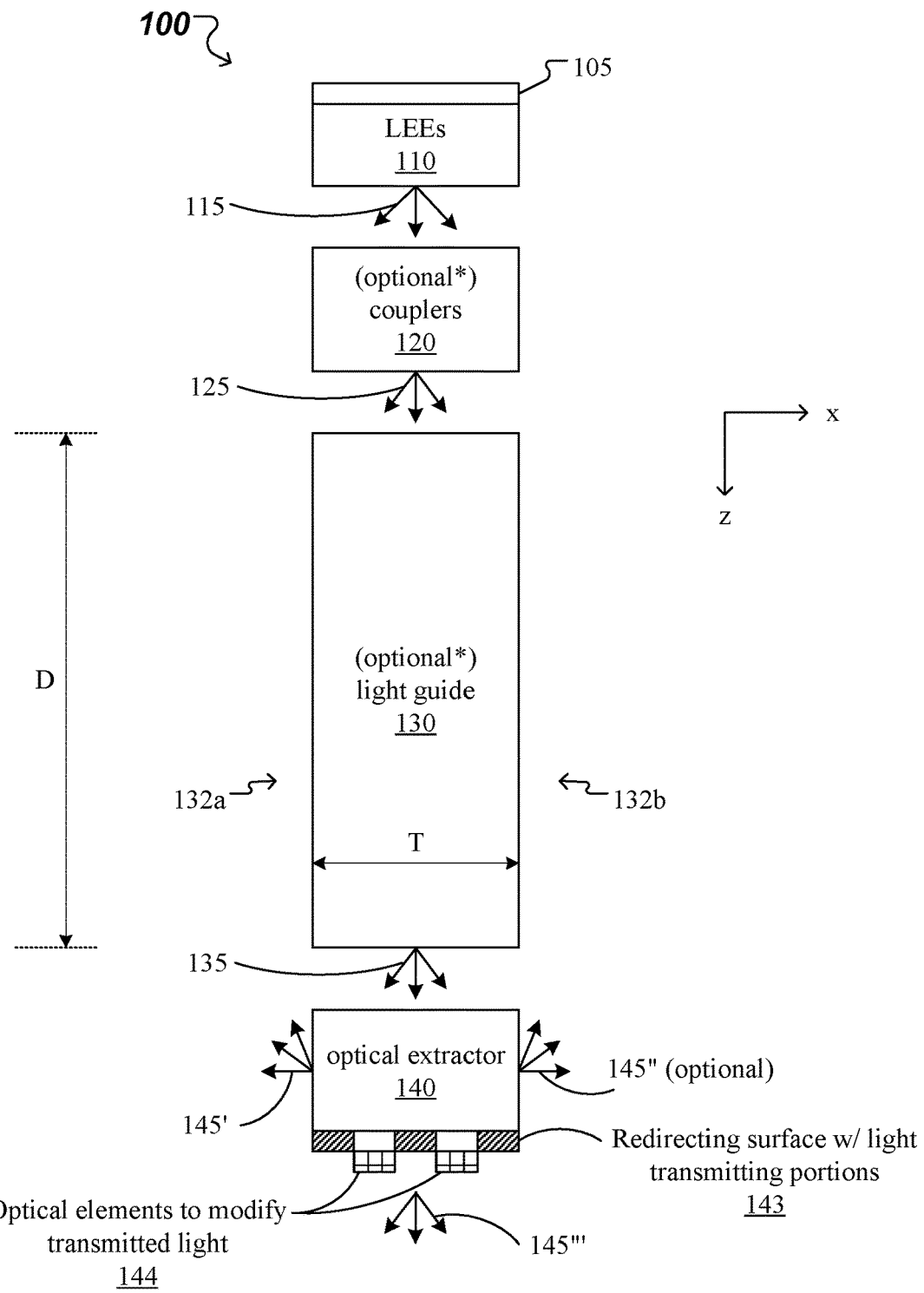
FIG. 1A shows a diagrammatic representation of an illumination device that includes an optical extractor with a redirecting surface having light transmitting portions and optical elements coupled with the light transmitting portions to modify the transmitted light.

(i) Illumination Device that Includes an Optical Extractor with a Redirecting Surface Having Light Transmitting Portions and Optical Elements Coupled with the Light Transmitting Portions to Modify the Transmitted Light FIG. 1A illustrates a block diagram of an illumination device 100 that includes an optical extractor 140 with a redirecting surface 143 having light transmitting portions and optical elements 144 coupled with the light transmitting portions to modify the transmitted light. In some implementations, the illumination device 100 further includes a substrate 105, one or more light emitting elements (LEEs) 110 and a light guide 130. Here, the light guide 130 guides the light provided by the LEEs 110 along a length D (e.g., along the z-axis of the Cartesian reference system shown in FIG. 1A.) In some implementations, the luminaire module 100 further includes the substrate 105, the LEE(s) 110 and one or more optical couplers 120, such that the optical extractor 140 is spaced apart from the optical coupler(s) 120 by a distance D (e.g., along the z-axis) and receives the light provided by the optical coupler(s) 120. In some implementations, the illumination device 100 includes the substrate 105, the LEE(s) 110, the optical coupler(s) 120 and the light guide 130, such that the light guide 130 is coupled at its input end to the optical coupler(s) 120 and at its output end to the optical extractor 140. The illumination device 100 may also be referred to as a luminaire module.

In general, a LEE, also referred to as a light emitter, is a device that can emit radiation in one or more regions of the electromagnetic spectrum from among the visible region, the infrared region and/or the and ultraviolet region, when activated. Activation of a LEE can be achieved by applying a potential difference across components of the LEE or passing a current through components of the LEE, for example. A LEE can have monochromatic, quasi-monochromatic, polychromatic or broadband spectral emission characteristics. Examples of LEEs include semiconductor, organic, polymer/polymeric light-emitting diodes, other monochromatic, quasi-monochromatic or other light-emitting elements. In some implementations, a LEE is a specific device that emits the radiation, for example a LED die. In other implementations, the LEE includes a combination of the specific device that emits the radiation (e.g., a LED die) together with a housing or package within which the specific device or devices are placed. Examples of LEEs include also lasers and more specifically semiconductor lasers, such as vertical cavity surface emitting lasers (VCSELs) and edge emitting lasers. Further examples of LEEs include superluminescent diodes and other superluminescent devices.

During operation, the LEEs 110 provide light within a first angular range 115. Such light can have a Lambertian distribution relative to the optical axes of the one or more LEEs 110 (e.g., the z-axis.) As used herein, providing light in an "angular range" refers to providing light that propagates in one or more prevalent directions in which each has a divergence with respect to the corresponding prevalent direction. In this context, the term "prevalent direction of propagation" can refer to a direction along which a portion of an intensity distribution of the propagating light has a maximum, a mean, a median or other defined direction. For example, the prevalent direction of propagation associated with the angular range can be an orientation of a lobe of the intensity distribution. (See, e.g., FIG. 1F.) Also in this context, the term "divergence" refers to a solid angle outside of which the intensity distribution of the propagating light drops below a predefined fraction of a maximum of the intensity distribution. For example, the divergence associated with the angular range can be the width of the lobe of the intensity distribution. The predefined fraction can be 10%, 5%, 1%, or other values, depending on the lighting application.

In implementations in which the light guide 130 is part of the luminaire module 100, the light guide 130 can be made from a solid, transparent material. Here, the light guide 130 is arranged to receive the light provided by the LEEs 110 at one end of the light guide 130 and to guide the received light in a forward direction, e.g., along the z-axis, from the receiving end to an opposing end of the light guide 130. Here, the distance D between the receiving end of the light guide 130 and its opposing end can be 5, 10, 20, 50 or 100 cm, for instance. A combination of (i) an angular range in which the light is received by the light guide 130 at the receiving end and (ii) a numerical aperture of the light guide 130 is configured such that the received light is guided from the receiving end to the opposing end through reflection off of light guide side surfaces 132a, 132b of the light guide 130. Depending on the implementation, at least some, if not all, of this reflection is via total internal reflection (TIR). In some implementations, the numerical aperture of the light guide 130 is such that all light provided by the LEEs 110 in the angular range 115 can be injected directly into the light guide 130 at its receiving end.

In the implementations in which the one or more optical couplers 120 are part of the luminaire module 100, the one or more optical couplers 120 receive the light from the LEEs 110 within the first angular range 115 and collimate the received light within a second angular range 125 in the forward direction. The one or more optical couplers 120 are shaped to transform the first angular range 115 into the second angular range 125 via total internal reflection, specular reflection or both. As such, the one or more optical couplers 120 can include a solid transparent material for propagating light from an input end to an output end of each of the one or more optical couplers 120. Here, the divergence of the second angular range 125 is smaller than the divergence of the first angular range 115. As such, in implementations in which the light guide 130 is not part of the luminaire module 100, a combination of the divergence of the second angular range 125 and the distance D that separates the optical extractor 140 from the optical coupler(s) 120 is selected such that all collimated light provided by the optical coupler(s) 120 in the angular range 125 impinges on the optical extractor 140. Additionally, in implementations in which the light guide 130 also is part of the luminaire module 100, the divergence of the second angular range 125 is selected such that all light provided by the coupler(s) 120 in the angular range 125 can be injected into the light guide 130 at its receiving end.

One or more of the light guide side surfaces 132a, 132b can be planar, curved or otherwise shaped. The light guide side surfaces 132a, 132b can be parallel or non-parallel. In embodiments with non-parallel light guide side surfaces 132a, 132b, a third angular range 135 of the guided light at the opposing end of the light guide 130 is different than the angular range 115 (when the light guide 130 receives the light directly from the LEEs 110) or 125 (when the light guide 130 receives the light from the couplers 120) of the light received at the receiving end. Here, the light guide side surfaces 132a, 132b can be optically smooth to allow for the guided light to propagate forward (e.g., in the positive direction of the z-axis) inside the light guide 130 through TIR. In this case, the light guide side surfaces 132a, 132b are shaped and arranged with respect to the z-axis and each other such that the guided light impinges on the light guide side surfaces 132a, 132b at incident angles larger than a critical angle over the entire distance D, from the input end to the output end of the light guide 130. In embodiments with parallel light guide side surfaces 132a, 132b, whether the light guide 130 is solid or hollow, the third angular range 135 of the guided light at the opposing end of the light guide 130 has at least substantially the same divergence as the angular range 115 (when the light guide 130 receives the light directly from the LEEs 110) or 125 (when the light guide 130 receives the light directly from the couplers 120) of the light received at the receiving end.

Additionally, in implementations in which the light guide 130 is part of the luminaire module 100, the length D of the light guide 130 (along the z-axis), a width L of the light guide 130 (along the y-axis) and a thickness T of the light guide 130 (along the x-axis) are designed to homogenize the light emitted by the discrete LEEs 110—which are distributed along the y-axis—as it is guided from the receiving end to the opposing end of the light guide 130. In this manner, the homogenizing of the emitted light—as it is guided through the light guide 130—causes a change of a discrete profile along the y-axis of the first angular range 115 (when the light guide 130 receives the light directly from the LEEs 110) or the second angular range 125 (when the light guide 130 receives the light from the couplers 120) to a continuous profile along the y-axis of the third angular range 135 in which the discrete profile is partially or fully blurred.

Moreover, in implementations in which the one or more optical couplers 120 are part of the luminaire module 100 and the light guide 130 is not, the separation D (along the z-axis) between the optical coupler(s) 120 and the optical extractor 140, a width L of the optical extractor 140 (along the y-axis) and a thickness T the optical extractor 140 (along the x-axis) are designed to homogenize the light emitted by the discrete LEEs 110—which are distributed along the y-axis—as it is first collimated by the optical coupler(s) 120 and then directed from the optical coupler(s) 120 over the distance D to the optical coupler 140. In this manner, the homogenizing of the emitted/collimated light—as it propagates over the distance D from the optical coupler(s) 120 to the optical extractor 140—causes a change of a discrete profile along the y-axis of the second angular range 125 of the collimated light to a continuous profile along the y-axis of the third angular range 135 in which the discrete profile is partially or fully blurred.

Here, the optical extractor 140 includes a redirecting surface 143 with light transmitting portions. The redirecting surface 143 is arranged and configured to reflect some of the collimated light received from the optical couplers 120 (for embodiments of the illumination device 100 without a light guide 130) or some of the guided light received from the light guide 130 (for embodiments of the illumination device 100 with a light guide 130). The redirecting surface 143 is formed from a reflecting coating that includes one or more metal layers, such as, e.g., Ag, Au, Al, or dielectric layers. The light transmitting portions of the redirecting surface 143, also referred to as transmissive portions of the redirecting surface 143, represent voids of or openings in the reflecting coating of the redirecting surface 143. In this manner, the transmissive portions transmit substantially all light impinging thereon, except for a small fraction of the impinging light, e.g., 4% or less, that is reflected via Fresnel reflection.

The optical extractor also includes optical elements 144 that are optically coupled with the light transmitting portions of the redirecting surface 143 to modify the transmitted light. The foregoing optical elements 144 are also referred to as light modifying elements 144. In some implementations, the light modifying elements 144 are configured to modify a spectral distribution of the light transmitted through the transmissive portions of the redirecting surface 143. Here, the light modifying elements 144 include inelastic scattering centers such that the modified light provided by the light modifying elements 144 of the optical extractor 140 has a spectral distribution different from a spectral distribution of the guided light provided by the light guide 130 (for embodiments of the illumination device 100 with a light guide 130) or the collimated light provided by the optical coupler(s) 120 (for embodiments of the illumination device 100 without a light guide 130). In some implementations, the light modifying elements 144 are configured to modify an intensity distribution of the light transmitted through the transmissive portions of the redirecting surface 143. Here, the light modifying elements 144 can be elastic scattering optics or refractive optics (e.g., lenses, micro-lenses, etc.) such that the modified light provided by the light modifying elements 144 of the optical extractor 140 has an intensity distribution different from an intensity distribution of the guided light provided by the light guide 130 (for embodiments of the illumination device 100 with a light guide 130) or the collimated light provided by the optical coupler(s) 120 (for embodiments of the illumination device 100 without a light guide 130).

Furthermore, the optical extractor 140 can output into the ambient environment light reflected by the redirecting surface 143 in one or more backward angular ranges. As such, at least some of the light reflected by the redirecting surface 143 is output by the extractor 140 within a first output angular range 145'. The first output angular range 145' can be substantially continuous along the y-axis and has a first output propagation direction with a component along a backward direction (or opposite to the forward direction, e.g., antiparallel to the z-axis.) Additionally, the light modified by the light modifying elements 144 coupled with the transmissive portions of the redirecting surface 143 is output by the optical extractor 140 within a second output angular range 145'''. The second output angular range 145''' can be substantially continuous along the y-axis and has a second output propagation direction with a component along the forward direction (e.g., along the z-axis.) In some implementations, some of the light reflected by the redirecting surface 143 can be output by the extractor 140 within a third output angular range 145''. The third output angular range 145'' can be substantially continuous along the y-axis and has a third output propagation direction with a component along the backward direction. In this case, the first output propagation direction and the third output propagation direction have respective components orthogonal to the forward direction that are opposite (antiparallel) to each other (antiparallel and parallel to the x-axis.)

Figure 1B:
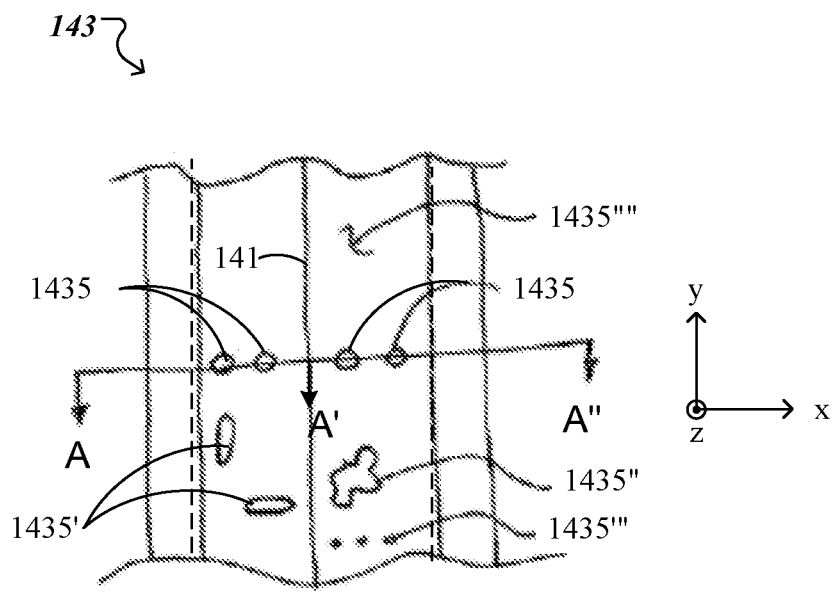
FIG. 1B shows examples of transmitting portions of the redirecting surface of the illumination device shown in FIG. 1A.
Figure 1C:
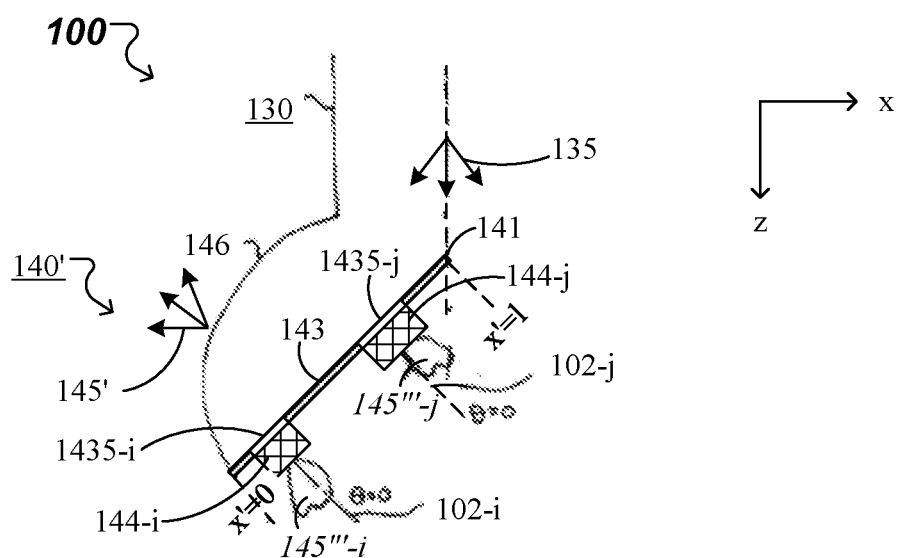
FIGS. 1C-1E show aspects of near-field intensity distributions of the illumination device shown in FIG. 1A.

FIG. 1B is a sectional view—through an (x-y) projection of the redirecting surface 143 of an optical extractor 140'—that shows a variety of different shapes and sizes of transmissive portions (e.g., voids or openings in the reflective coating) of the redirecting surface 143. FIG. 1C is a sectional view A-A' (in the x-z plane) of an embodiment (elongated along the y-axis) of the disclosed luminaire module 100 that includes the light guide 130 and the optical extractor 140'. Here, the optical extractor 140' has a v-groove shaped redirecting surface 143 (with an apex 141) and corresponding curved output surface(s) 146 facing the redirecting surface 143. Referring again to FIG. 1B, the apex 141 of the redirecting surface 143 and the intersection(s) of the redirecting surface 143 with the curved output surface(s) 146 are represented in full-lines along the y-axis. Also, a footprint of the light guide 130 is represented in dashed-lines along the y-axis.

The properties of the voids or openings in the redirecting surface 143 can be varied significantly across the redirecting surface 143 as needed to provide for specific quantities and directional capabilities of the light transmitted through these transmissive portions of the redirecting surface 143. For instance, the redirecting surface 143 can have transmissive portions 1435 with a convex contour with an aspect ratio close to 1; transmissive portions 1435' with a convex contour with an aspect ratio>>1 (or <<1); transmissive portions 1435'' with a concave contour; point-like ("0-dimensional") transmissive portions 1435'''; curve-like ("1-dimensional") transmissive portions 1435'''', and the like. Such transmissive portions can be distributed in many different ways along the redirecting surface 143 of the extractor 140 to provide a desired quantity and/or aesthetic appearance of the light transmitted through the transmissive portions or to support limitations of a particular manufacturing method of the transmissive portions. Some manufacturing methods include laser drilling, direct printing, lithography methods including etching or other methods such that a pattern of voids can be produced in the reflective coating of the redirecting surface 143 of the extractor 140 that will allow a portion of the light reaching the redirecting surface 143 of the extractor 140 to be transmitted to the modifying optical elements 144 coupled thereof.

Referring now to FIG. 1C, a set of N transmissive portions 1435 of the redirecting surface 143 are distributed along an x'-axis extending over a distance "l" from the intersection of the redirecting surface 143 with the curved output surface 146 (at x'=0) to the vertex 141 of the redirecting surface 143 (at x'=1). Additionally, N light modifying elements 144 are optically coupled with the transmissive portions 1435. For example, a light modifying element 144-$i$ is connected (e.g., bonded or glued) to the underlying uncoated surface of the optical extractor 140' corresponding to the void or opening 1435-$i$, where i=1 . . . N. A normal 102-$i$ to the redirecting surface 143 is defined at a location (e.g., center) of the transmissive portion 1435-$i$. As another example, another light modifying element 144-$j$ is connected to the underlying uncoated surface of the optical extractor 140' corresponding to the void or opening 1435-$j$, where j=1 . . . N and j≠i. A normal 102-$j$ to the redirecting surface 143 is defined at a location of the transmissive portion 1435-$j$. In this manner, it is possible to define a segment by segment flux mapping for the light output by the optical extractor 140' in the forward angular range 145''' over a distance "l" along the x'-axis. Here, the light output in the forward angular range 145''' by the optical extractor 140' originates as a portion of the guided light in the angular range 135 that impinges on the N transmissive portions 1435 of the redirecting surface 143, then it is transmitted there through before it is modified by the N modifying optical elements 144. Example segment angular ranges 145'''-$i$ and 145'''-$j$ illustrate different segment angular ranges that are present at different segment locations over the length "l" along the x'-axis.

In some implementations, at least a propagation direction or a divergence, or both, of a segment angular range 145'''-$i$, where i=1 . . . N, of the output light is constant over the length "l" along the x'-axis. In other implementations, at least propagation directions or divergencies, or both, of the segment angular ranges 145'''-$i$ and 145'''-$j$, for any (i,j) combination, where j≠i and i, j=1 . . . N, of the output light is different over the length "l" along the x'-axis.

Figure 1D:
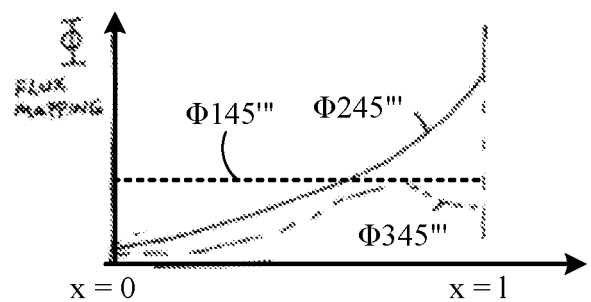
Figure 1E:
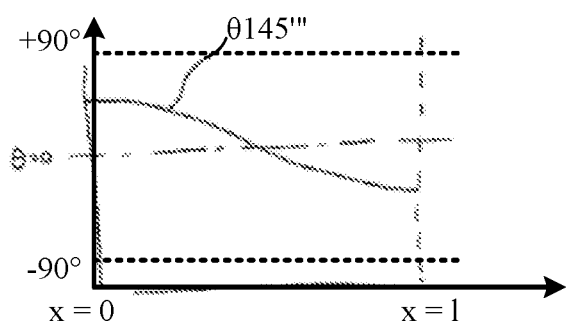

For illustration, a range of possible distributions of light flux Φ145''', Φ245''', Φ345''' for each segment over the length "l" along the x'-axis are shown in FIG. 1D. The distributions of light flux Φ145''', Φ245''', Φ145''' are indicative of underlying distributions of divergencies of angular ranges 145''', 245''', 345''' of guided light transmitted through the N transmissive portions 1435-$j$ of the redirecting surface 143 and modified by the N modifying optical elements 144-*j*, where j=1 . . . N. FIG. 1E provides an example of how the peak intensity θ145''' for each segment can vary over the length "l" along the x'-axis. The distribution of peak intensity θ145''' is indicative of an underlying distribution of directions (relative to the normal 102-*j*) of the angular range 145''' of the guided light transmitted through the N transmissive portions 1435-*j* of the redirecting surface 143 and modified by the N modifying optical elements 144-*j*, where j=1 . . . N.

Furthermore, these distributions of flux Φ145''' and peak intensity θ145''' also change along the longitudinal axis (e.g., y-axis) of the redirecting surface 143 of the optical extractor 140'. As such, a two dimensional mapping of the v-groove redirecting surface 143 can be generated that provides a clear view of variance in output flux and direction. Such two dimensional distributions are at least a function of the optical properties and arrangement of the LEEs 110 and a design of the optical coupler(s) 120, light guide 130 and optical extractor 140. Although these near-field light distributions can be highly variable depending on the optical constituent components and geometries, a mapping of the near-field light distributions can be created in most cases. Such mapping may permit optimization decisions for the final desired optical distribution from the luminaire module 100.

Specifically the value of this information from a two dimensional mapping is that the distribution and shape of voids 1435, 1435', 1435'', 1435''' and 1435'''' can be selected to target regions of the redirecting surface 143 of the optical extractor 140' where specific properties of an intensity distribution of the light output by the optical extractor 140' are most efficiently coupled to the application lighting needs. For example, it may be desirable to avoid regions of the redirecting surface 143 of the optical extractor 140' where the distribution of peak intensity θ145''' will create excessive luminance in a particular field of view. By carefully mapping the redirecting surface 143 of the optical extractor 140' it is possible to create an optimized near field luminance pattern on the redirecting surface 143 of the optical extractor 140' that improves the visual appeal and comfort of the final luminaire design in the illuminated space. Furthermore, it may also provide a means to optimize the distributions of flux Φ145''' and peak intensity θ145''' by selecting various types of optical elements 144-*j*, j=1 . . . N, which may be varied over the length "l" along the x'-axis and along the length L of the optical extractor 140' (along the y-axis) to fine tune the final optical emission patterns and source luminance.

As described above in connection with FIGS. 1A-1C, the one or more optical couplers 120, light guide 130 and the optical extractor 140 (140') of illumination device 100 are arranged and configured to translate and redirect light emitted by LEEs 110 away from the LEEs before the light is output into the ambient environment. The spatial separation of the place of generation of the light, also referred to as the physical (light) source, from the place of extraction of the light, also referred to as a virtual light source or a virtual filament, can facilitate design of the illumination device 100. In this manner, a virtual filament can be configured to provide substantially non-isotropic light emission with respect to planes parallel to an optical axis of the illumination device (for example the z-axis.) In contrast, a typical incandescent filament generally emits substantially isotropically distributed amounts of light. The virtual filament(s) may be viewed as one or more portions of space from which substantial amounts of light appear to emanate. Furthermore, separating the LEEs 110, with their predetermined optical, thermal, electrical and mechanical constraints, from the place of light extraction, may facilitate a greater degree of design freedom of the illumination device 100 and allows for an extended optical path, which can permit a predetermined level of light mixing before light is output from the illumination device 100.

Figure 1F:
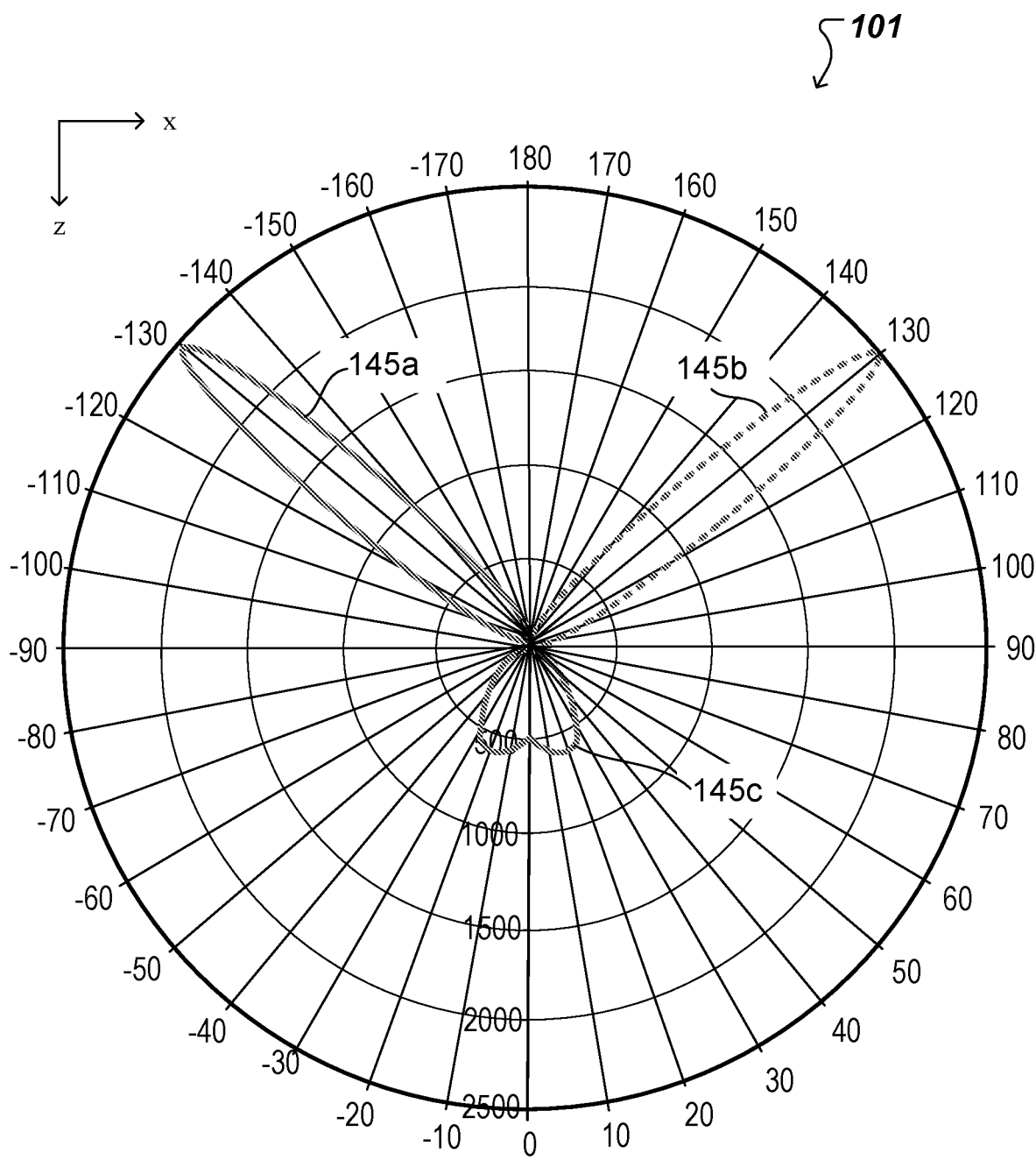
FIG. 1F is a far-field intensity profile of the illumination device shown in FIG. 1A.

FIG. 1F shows an x-z cross-section of far-field light intensity profile 101 of the illumination device 100 that is elongated along the y-axis (perpendicular to the sectional plane of FIG. 1A). In some implementations, the far-field light intensity profile 101 includes a first output lobe 145*a* representing light output by the illumination device 100 in the first output angular range 145' and a second output lobe 145*c* representing modified light output by the illumination device 100 in the forward output angular range 145'''.

For example, the first output lobe 145*a* is a representation of the intensity, divergence and propagation direction of light output by the optical extractor 140' in the first output angular range 145' when this output light reaches a target located far from the optical extractor 140'. Here, the light output in the output angular range 145' originates as a portion of the guided light in the angular range 135 that impinges on the redirecting surface 143 outside of the N transmissive portions 1435 where it is reflected towards the curved output surface 146 and where it is transmitted through the curved output surface 146 to the ambient environment. In this case, a propagation direction of the first output angular range 145' is along the about −130° bisector of the first output lobe 145*a*.

As another example, the second output lobe 145*c* is a representation of the intensity, divergence and propagation direction of modified light output by the optical extractor 140' in the forward output angular range 145''' when this modified light reaches a target located far from the optical extractor 140'. Here, the forward output angular range 145''' is formed as a superposition of the N segment angular ranges 145'''-*j*, where j=1 . . . N (and of other N segment angular ranges 145'''-*j* that are mirrored relative to an optical axis that passes through the apex 141 and is parallel to the z-axis; the other N segment angular ranges 145'''-*j* correspond to the cross-section A'-A'' which is not depicted in FIG. 1C.) In this manner, the modified light output in the forward output angular range 145''' originates as a portion of the guided light in the angular range 135 that impinges on the N transmissive portions 1435-*j* of the redirecting surface 143 (and other N transmissive portions 1435-*j* disposed on the redirecting surface 143 and are mirrored relative to the optical axis), then it is transmitted there through before it is modified by the N modifying optical elements 144-*j*, where j=1 . . . N (and by the other N mirrored transmissive portions 1435-*j*). In this case, a propagation direction of the forward angular range 145'' is along the about 0° bisector of the second output lobe 145*c*. Further in this case, a divergence of the first output angular range 145' (represented by a width of the first output lobe 145*a*) is smaller than a divergence of the forward angular range 145''' (represented by a width of the second output lobe 145*c*).

In some implementations, in addition to the first output lobe 145*a* and the second output lobe 145*c*, the far-field light intensity profile 101 includes a third output lobe 145*b* representing light output by the illumination device 100 in the second output angular range 145''. For example, the third output lobe 145*b* is a representation of the intensity, divergence and propagation direction of light output by the optical extractor 140' in a second output angular range 145'' when this output light reaches a target located far from the optical extractor 140'. Here, the light output in the second output angular range 145″ originates as a portion of the guided light in the angular range 135 that impinges on the redirecting surface 143 outside of the other N mirrored transmissive portions 1435 where it is reflected towards another curved output surface 146 mirrored relative to the optical axis and where it is transmitted through the other curved output surface 146 to the ambient environment. In this case, a propagation direction of the second output angular range 145″ is along the about +130° bisector of the third output lobe 145b. Further in this case, a divergence of the second output angular range 145″ (represented by a width of the third output lobe 145b) is smaller than the divergence of the forward angular range 145‴ (represented by the width of the second output lobe 145c) and about the same as the divergence of the first output angular range 145′ (represented by the width of the first output lobe 145a).

Notably, the far-field light intensity profile 101 of the illumination device 100 includes a range of angles between +40° and +120° and between −40° and −120° where the emission of light from the optical extractor 140 (140′) is minimized. In this region the apparent luminance of the illumination device 100 also is minimized such that luminous intensity and what is often called "glare" into the space would be well managed. In many popular prior art luminaire designs the overall radiation pattern is often a derivative of a typical Lambertian profile such that there are usually emitting surfaces of Lambertian luminance that are in plain view within the users' field of view. One of the primary advantages of the illumination device 100 is that the ratio between the peak intensity of a lobe 145a, 145b or 145c and the minimum intensity between two adjacent lobes (145a and 145c; or 145b and 145c) of the far-field light intensity profile 101 can be very high and readily exceed 5 to 1.

As described in detail below, composition and geometry of the couplers 120, the light guide 130 and the extractor 140 (140′) of the illumination device 100 can affect the far-field light intensity profile 101, e.g., the propagation direction and divergence associated with the first output lobe 145a and the second output lobe 145c, and, optionally, of the third output lobe 145b.

Prior to describing various embodiments of the illumination device 100 that are configured to include an optical extractor with a redirecting surface having light transmitting portions and optical elements coupled with the light transmitting portions to modify the transmitted light, a light guide illumination device is described for which the optical extractor has a redirecting surface with light transmitting portions but does not include modifying optical elements.

Figure 2A:
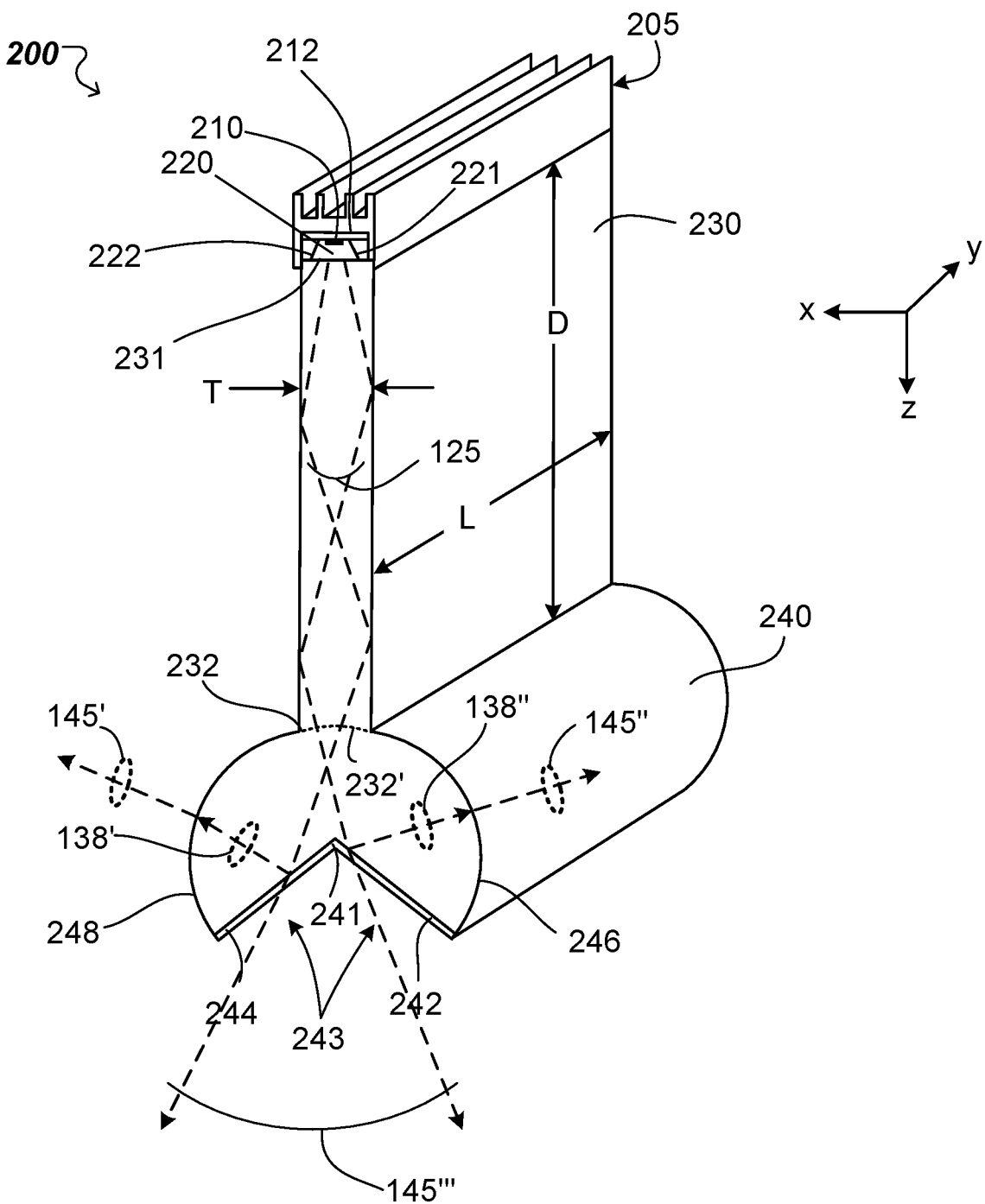

(ii) Luminaire Module Including an Optical Extractor with a Redirecting Surface Having Light Transmitting Portions Referring to FIG. 2A, in which a Cartesian coordinate system is shown for reference, a luminaire module 200 includes a mount 212 having a plurality of LEEs 210 distributed along a first surface of the mount 212. The mount with the LEEs 210 is disposed at a first (e.g., upper) edge 231 of a light guide 230. Once again, the positive z-direction is referred to as the "forward" direction and the negative z-direction is the "backward" direction. Sections through the luminaire module 200 parallel to the x-z plane are referred to as the "cross-section" or "cross-sectional plane" of the luminaire module. Also, luminaire module 200 extends along the y-direction, so this direction is referred to as the "longitudinal" direction of the luminaire module. Implementations of luminaire modules can have a plane of symmetry parallel to the y-z plane, be curved or otherwise shaped. This is referred to as the "symmetry plane" of the luminaire module.

Multiple LEEs 210 are disposed on the first surface of the mount 212, although only one of the multiple LEEs 210 is shown in FIG. 2A. For example, the plurality of LEEs 210 can include multiple white LEDs. The LEEs 210 are optically coupled with one or more optical couplers 220 (only one of which is shown in FIG. 2A). An optical extractor 240 is disposed at second (e.g., lower) edge 232 of light guide 230.

Mount 212, light guide 230, and optical extractor 240 extend a length L along the y-direction, so that the luminaire module is an elongated luminaire module with an elongation of L that may be about parallel to a wall of a room (e.g., a ceiling of the room). Generally, L can vary as desired. Typically, L is in a range from about 1 cm to about 200 cm (e.g., 20 cm or more, 30 cm or more, 40 cm or more, 50 cm or more, 60 cm or more, 70 cm or more, 80 cm or more, 100 cm or more, 125 cm or more, or, 150 cm or more).

The number of LEEs 210 on the mount 212 will generally depend, inter alia, on the length L, where more LEEs are used for longer luminaire modules. In some implementations, the plurality of LEEs 210 can include between 10 and 1,000 LEEs (e.g., about 50 LEEs, about 100 LEEs, about 200 LEEs, about 500 LEEs). Generally, the density of LEEs (e.g., number of LEEs per unit length) will also depend on the nominal power of the LEEs and illuminance desired from the luminaire module. For example, a relatively high density of LEEs can be used in applications where high illuminance is desired or where low power LEEs are used. In some implementations, the luminaire module 200 has LEE density along its length of 0.1 LEE per centimeter or more (e.g., 0.2 per centimeter or more, 0.5 per centimeter or more, 1 per centimeter or more, 2 per centimeter or more). The density of LEEs may also be based on a desired amount of mixing of light emitted by the multiple LEEs. In implementations, LEEs can be evenly spaced along the length, L, of the luminaire module. In some implementations, a heat-sink 205 can be attached to the mount 212 to extract heat emitted by the plurality of LEEs 210. The heat-sink 205 can be disposed on a surface of the mount 212 opposing the side of the mount 212 on which the LEEs 210 are disposed. The luminaire module 200 can include one or multiple types of LEEs, for example one or more subsets of LEEs in which each subset can have different color or color temperature.

Optical coupler 220 includes one or more solid pieces of transparent optical material (e.g., a glass material or a transparent plastic, such as polycarbonate or acrylic) having surfaces 221 and 222 positioned to reflect light from the LEEs 210 towards the light guide 230. In general, surfaces 221 and 222 are shaped to collect and at least partially collimate light emitted from the LEEs. In the x-z cross-sectional plane, surfaces 221 and 222 can be straight or curved. Examples of curved surfaces include surfaces having a constant radius of curvature, parabolic or hyperbolic shapes. In some implementations, surfaces 221 and 222 are coated with a highly reflective material (e.g., a reflective metal, such as aluminum or silver), to provide a highly reflective optical interface. The cross-sectional profile of optical coupler 220 can be uniform along the length L of luminaire module 200. Alternatively, the cross-sectional profile can vary. For example, surfaces 221 and/or 222 can be curved out of the x-z plane.

The exit aperture of the optical coupler 220 adjacent upper edge of light guide 231 is optically coupled to edge 231 to facilitate efficient coupling of light from the optical coupler 220 into light guide 230. For example, the surfaces of a solid coupler and a solid light guide can be attached using a material that substantially matches the refractive index of the material forming the optical coupler 220 or light guide 230 or both (e.g., refractive indices across the interface are different by 2% or less.) The optical coupler 220 can be affixed to light guide 230 using an index matching fluid, grease, or adhesive. In some implementations, optical coupler 220 is fused to light guide 230 or they are integrally formed from a single piece of material (e.g., coupler and light guide may be monolithic and may be made of a solid transparent optical material).

Light guide 230 is formed from a piece of transparent material (e.g., glass material such as BK7, fused silica or quartz glass, or a transparent plastic, such as polycarbonate or acrylic) that can be the same or different from the material forming optical couplers 220. Light guide 230 extends length L in the y-direction, has a uniform thickness T in the x-direction, and a uniform depth D in the z-direction. The dimensions D and T are generally selected based on the desired optical properties of the light guide (e.g., which spatial modes are supported) and/or the direct/indirect intensity distribution. During operation, light coupled into the light guide 230 from optical coupler 220 (with an angular range 125) reflects off the planar surfaces of the light guide by TIR and spatially mixes within the light guide. The mixing can help achieve illuminance and/or color uniformity, along the y-axis, at the distal portion of the light guide 232 at optical extractor 240. The depth, D, of light guide 230 can be selected to achieve adequate uniformity at the exit aperture (i.e., at end 232) of the light guide. In some implementations, D is in a range from about 1 cm to about 20 cm (e.g., 2 cm or more, 4 cm or more, 6 cm or more, 8 cm or more, 10 cm or more, 12 cm or more).

In general, optical couplers 220 are designed to restrict the angular range of light entering the light guide 230 (e.g., to within +/−40 degrees) so that at least a substantial amount of the light (e.g., 95% or more of the light) is optically coupled into spatial modes in the light guide 230 that undergoes TIR at the planar surfaces. Light guide 230 can have a uniform thickness T, which is the distance separating two planar opposing surfaces of the light guide. Generally, T is sufficiently large so the light guide has an aperture at first (e.g., upper) surface 231 sufficiently large to approximately match (or exceed) the exit aperture of optical coupler 220. In some implementations, T is in a range from about 0.05 cm to about 2 cm (e.g., about 0.1 cm or more, about 0.2 cm or more, about 0.5 cm or more, about 0.8 cm or more, about 1 cm or more, about 1.5 cm or more). Depending on the implementation, the narrower the light guide the better it may spatially mix light. A narrow light guide also provides a narrow exit aperture. As such light emitted from the light guide can be considered to resemble the light emitted from a one-dimensional linear light source, also referred to as an elongate virtual filament.

While optical coupler 220 and light guide 230 are formed from solid pieces of transparent optical material, hollow structures are also possible. For example, the optical coupler 220 or the light guide 230 or both may be hollow with reflective inner surfaces rather than being solid. As such, material cost can be reduced and absorption in the light guide can be mitigated. A number of specular reflective materials may be suitable for this purpose including materials such as 3M Vikuiti™ or Miro IV™ sheet from Alanod Corporation where greater than 90% of the incident light can be efficiently guided to the optical extractor.

Optical extractor 240 is also composed of a solid piece of transparent optical material (e.g., a glass material or a transparent plastic, such as polycarbonate or acrylic) that can be the same as or different from the material forming light guide 230. In the example implementation shown in FIG. 2A, the optical extractor 240 includes redirecting (e.g., flat) surfaces 242 and 244 and curved surfaces 246 and 248. The flat surfaces 242 and 244 represent first and second portions of a redirecting surface 243, while the curved surfaces 246 and 248 represent first and second output surfaces of the luminaire module 200.

Surfaces 242 and 244 are coated with a reflective material (e.g., a highly reflective metal such as aluminum or silver) over which a protective coating may be disposed. For example, the material forming such a coating may reflect about 95% or more of light incident thereon at appropriate (e.g., visible) wavelengths. Here, surfaces 242 and 244 provide a highly reflective optical interface for light having the angular range 125 entering an input end of the optical extractor 232' from light guide 230. As another example, the surfaces 242 and 244 include portions that are transparent to the light entering at the input end 232' of the optical extractor 240. Here, these portions can be uncoated regions (e.g., partially silvered regions) or discontinuities (e.g., slots, slits, apertures) of the surfaces 242 and 244.

Figure 2B:
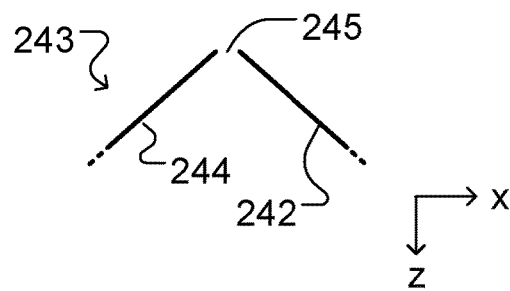
Figure 2C:
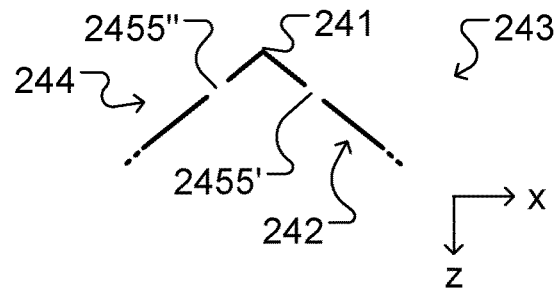

FIG. 2B shows that, in some implementations, the first and second portions of the redirecting surface 242, 244 can be separated, at least in part, by a transmissive portion 245 (e.g., a slot, void, opening.) FIG. 2C shows that, in some implementations, either the first and second portions of the redirecting surface 242, 244 can include one or more transmissive portions 2455', 2455" (e.g., slots, voids, openings.) Each of the transmissive portions 245, 2455', 2455" may but does not need to extend along the entire longitudinal direction of the luminaire module 200. As described above in connection with FIG. 1B, such transmissive portions can represent openings in the coating reflecting layer of the redirecting surface 243, and are configured to allow a portion of light received from the input end of the extractor 232' to transmit through the transmissive portions 245, 2455', 2455" of the redirecting surface 243. FIG. 2B shows that, for a cross-sectional plane perpendicular to the longitudinal dimension of the luminaire module 200 which intersects the transmissive portion 245, first and second curves corresponding to the first and second portions of the redirecting surface 242, 244 are separated by a discontinuity. Moreover, FIG. 2C shows that, for a cross-sectional plane perpendicular to the longitudinal dimension the luminaire module 200 which intersects the transmissive portions 2455', 2455", first and second curves corresponding to the first and second portions of the redirecting surface [242, 244] include one or more discontinuities associated with the slots 2455', 2455". Note that the cross-sectional plane shown in FIG. 2C can correspond to a portion of the cross-section A-A" illustrated in FIG. 1B.

Figure 2D:
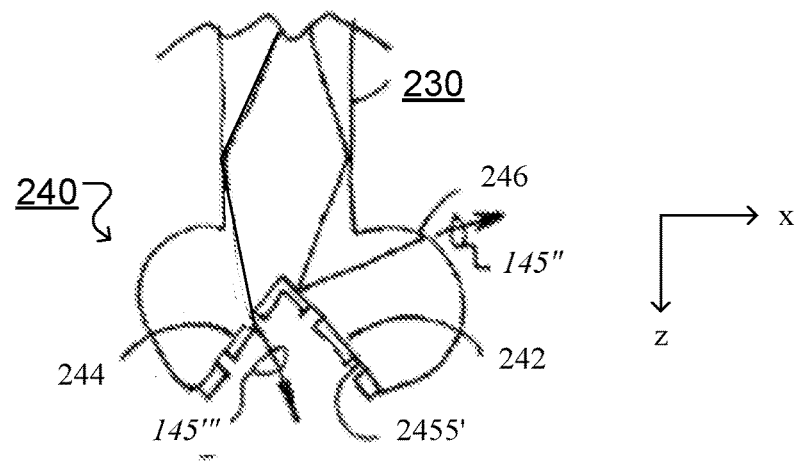

In addition, the curves corresponding to each of the cross-sectional planes illustrated in FIGS. 2B-2C can have different shapes and different discontinuities in other cross-sectional planes along the longitudinal dimension of the luminaire module 200. In general, different cross-sections of a redirecting surface 243 can have different combinations of disjoint or joined piecewise differentiable curves. As such, some light is transmitted in the forward direction (along the z-axis) through surfaces 242 and 244 of the optical extractor 240 in a forward output angular range 145'''. In the example illustrated in FIG. 2A, the light transmitted in the forward output angular range 145''' is refracted. In this way, the redirecting surface 243 acts as a beam splitter rather than a mirror, and transmits in the output angular range 145''' a desired portion of incident light, while reflecting the remaining light in angular ranges 138' and 138''. FIG. 2D shows a portion of a (x-z) cross-section of the luminaire module 200 having a redirecting surface 243 like the one illustrated in FIG. 2C. Here, light guided by the light guide 130 that impinges on the transmissive portions 2455' of the redirecting surface portion 242 and transmissive portions 2455'' of the redirecting portion 244 is transmitted there through to the ambient environment as output light in the forward output angular range 145'''. The light that impinges on the redirecting surface portions 242 and 244 outside of the transmissive portions 2455' and 2455'' is reflected thereof. The light reflected in that manner is output to the ambient environment through the curved output surfaces 246 and 248 of the optical extractor 240 in backward output angular ranges 145' and 145'', respectively.

Referring again to FIG. 2A, in the x-z cross-sectional plane, the lines corresponding to surfaces 242 and 244 have the same length and form an apex or vertex 241, e.g. a v-shape that meets at the apex 241. In general, an included angle (e.g., the smallest included angle between the surfaces 244 and 242) of the redirecting surfaces 242, 244 can vary as desired. For example, in some implementations, the included angle can be relatively small (e.g., from 30° to 60°). In certain implementations, the included angle is in a range from 60° to 120° (e.g., about 90°). The included angle can also be relatively large (e.g., in a range from 120° to 150° or more). In the example implementation shown in FIG. 2A, the output surfaces 246, 248 of the optical extractor 240 are curved with a constant radius of curvature that is the same for both. In an aspect, the output surfaces 246, 248 may have optical power (e.g., may focus or defocus light.) Accordingly, luminaire module 200 has a plane of symmetry intersecting apex 241 parallel to the y-z plane.

The surface of optical extractor 240 adjacent to the lower edge 232 of light guide 230 is optically coupled to edge 232. For example, optical extractor 240 can be affixed to light guide 230 using an index matching fluid, grease, or adhesive. In some implementations, optical extractor 240 is fused to light guide 230 or they are integrally formed from a single piece of material.

The emission spectrum of the luminaire module 200 corresponds to the emission spectrum of the LEEs 210. However, in some implementations, a wavelength-conversion material may be positioned in the luminaire module, for example remote from the LEEs, so that the wavelength spectrum of the luminaire module is dependent both on the emission spectrum of the LEEs and the composition of the wavelength-conversion material. In general, a wavelength-conversion material can be placed in a variety of different locations in luminaire module 200. For example, a wavelength-conversion material may be disposed proximate the LEEs 210, adjacent surfaces 242 and 244 of optical extractor 240, on the exit surfaces 246 and 248 of optical extractor 240, and/or at other locations.

The layer of wavelength-conversion material (e.g., phosphor) may be attached to light guide 230 held in place via a suitable support structure (not illustrated), disposed within the extractor (also not illustrated) or otherwise arranged, for example. Wavelength-conversion material that is disposed within the extractor may be configured as a shell or other object and disposed within a notional area that is circumscribed between $R/n$ and $R*(1-n^2)^{(-1/2)}$, where R is the radius of curvature of the light-exit surfaces (246 and 248 in FIG. 2A) of the extractor 240 and n is the index of refraction of the portion of the extractor that is opposite of the wavelength-conversion material as viewed from the reflective surfaces (242 and 244 in FIG. 2A). The support structure may be a transparent self-supporting structure. The wavelength-conversion material diffuses light as it converts the wavelengths, provides mixing of the light and can help uniformly illuminate a surface of the ambient environment.

During operation, light exiting light guide 230 through end 232 impinges on the reflective interfaces at portions of the redirecting surface 242 and 244 and is reflected outwardly towards output surfaces 246 and 248, respectively, away from the symmetry plane of the luminaire module. The first portion of the redirecting surface 242 provides light having an angular distribution 138'' towards the output surface 246, the second portion of the redirecting surface 244 provides light having an angular distribution 138' towards the output surface 248. The light exits optical extractor through output surfaces 246 and 248. In general, the output surfaces 246 and 248 have optical power, to redirect the light exiting the optical extractor 240 in angular ranges 145' and 145'', respectively. For example, optical extractor 240 may be configured to emit light upwards (i.e., towards the plane intersecting the LEEs and parallel to the x-y plane), downwards (i.e., away from that plane) or both upwards and downwards. In general, the direction of light exiting the luminaire module through surfaces 246 and 248 depends on the divergence of the light exiting light guide 230 and the orientation of surfaces 242 and 244.

Surfaces 242 and 244 may be oriented so that little or no light from light guide 230 is output by optical extractor 240 in certain directions. In implementations where the luminaire module 200 is attached to a ceiling of a room (e.g., the forward direction is towards the floor) such configurations can help avoid glare and an appearance of non-uniform illuminance.

In general, the light intensity distribution provided by luminaire module 200 reflects the symmetry of the luminaire module's structure about the y-z plane. For example, referring to FIG. 1F, light output in angular range 145' corresponds to the first output lobe 145a of the far-field light intensity distribution 101, light output (leaked) in forward angular range 145''' corresponds to the second output lobe 145c of the far-field light intensity distribution 101, and light output in angular range 145'' corresponds to the third output lobe 145b of the far-field light intensity distribution 101. In general, an intensity profile of luminaire module 200 will depend on the configuration of the optical coupler 220, the light guide 230 and the optical extractor 240. For instance, the interplay between the shape of the optical coupler 220, the shape of the redirecting surface 243 of the optical extractor 240 and the shapes of the output surfaces 246, 248 of the optical extractor 240 can be used to control the angular width and prevalent direction (orientation) of the output first 145a and third 145b lobes in the far-field light intensity profile 101. Additionally, a ratio of an amount of light in the combination of first 145a and third 145b output lobes and light in the second output lobe 145c is controlled by reflectivity and transmissivity of the redirecting surfaces 242 and 244. For example, for a reflectivity of 90% and transmissivity of 10% of the redirecting surfaces 242, 244, 45% of light can be output in the output angular range 145' corresponding to the first output lobe 145a, 45% light can be output in the output angular range 145'' corresponding to the third output lobe 145b, and 10% of light can be output in the forward angular range 145' corresponding to the second output lobe 145c.

In some implementations, the orientation of the output lobes 145a, 145b can be adjusted based on the included angle of the v-shaped groove 241 formed by the portions of the redirecting surface 242 and 244. For example, a first included angle results in a far-field light intensity distribution 101 with output lobes 145a, 145b located at relatively smaller angles compared to output lobes 145a, 145b of the far-field light intensity distribution 101 that results for a second included angle larger than the first angle. In this manner, light can be extracted from the luminaire module 200 in a more forward direction for the smaller of two included angles formed by the portions 242, 244 of the redirecting surface 243.

Furthermore, while surfaces 242 and 244 are depicted as planar surfaces, other shapes are also possible. For example, these surfaces can be curved or faceted. Curved redirecting surfaces 242 and 244 can be used to narrow or widen the output lobes 145a, 145b. Depending of the divergence of the angular range 125 of the light that is received at the input end of the optical extractor 232', concave reflective surfaces 242, 244 can narrow the lobes 145a, 145b output by the optical extractor 240 (and illustrated in FIG. 1F), while convex reflective surfaces 242, 244 can widen the lobes 145a, 145b output by the optical extractor 240. As such, suitably configured redirecting surfaces 242, 244 may introduce convergence or divergence into the light. Such surfaces can have a constant radius of curvature, can be parabolic, hyperbolic, or have some other curvature.

In general, the geometry of the elements can be established using a variety of methods. For example, the geometry can be established empirically. Alternatively, or additionally, the geometry can be established using optical simulation software, such as Lighttools™, Tracepro™, FRED™ or Zemax™, for example.

In general, luminaire module 200 can be designed to output light into different output angular ranges 145', 145" from those shown in FIG. 2A. In some implementations, illumination devices can output light into lobes 145a, 145b that have a different divergence or propagation direction than those shown in FIG. 1F. For example, in general, the output lobes 145a, 145b can have a width of up to about 90° (e.g., 80° or less, 70° or less, 60° or less, 50° or less, 40° or less, 30° or less, 20° or less). In general, the direction in which the output lobes 145a, 145b are oriented can also differ from the directions shown in FIG. 1F. The "direction" refers to the direction at which a lobe is brightest. In FIG. 1F, for example, the output lobes 145a, 145b are oriented at approx. −130° and approximately +130°. In general, output lobes 145a, 145b can be directed more towards the horizontal (e.g., at an angle in the ranges from −90° to −135°, such as at approx. −90°, approx. −100°, approx. −110°, approx. −120°, approx. −130°, and from +90° to +135°, such as at approx. +90°, approx. +100°, approx. +110°, approx. +120°, approx. +130°.

The luminaire modules can include other features useful for tailoring the intensity profile. For example, in some implementations, luminaire modules can include an optically diffuse material that can diffuse light in a controlled manner to aid homogenizing the luminaire module's intensity profile. For example, surfaces 242 and 244 can be roughened or a diffusely reflecting material, rather than a specular reflective material, can be coated on these surfaces. Accordingly, the optical interfaces at surfaces 242 and 244 can diffusely reflect light, scattering light into broader lobes than would be provided by similar structures utilizing specular reflection at these interfaces. In some implementations these surfaces can include structure that facilitates various intensity distributions. For example, surfaces 242 and 244 can each have multiple planar facets at differing orientations. Accordingly, each facet will reflect light into different directions. In some implementations, surfaces 242 and 244 can have structure thereon (e.g., structural features that scatter or diffract light).

Surfaces 246 and 248 need not be surfaces having a constant radius of curvature. For example, surfaces 246 and 248 can include portions having differing curvature and/or can have structure thereon (e.g., structural features that scatter or diffract light). In certain implementations, a light scattering material can be disposed on surfaces 246 and 248 of optical extractor 240.

In some implementations, optical extractor 240 is structured so that a negligible amount (e.g., less than 1%) of the light propagating within at least one plane (e.g., the x-z cross-sectional plane) that is reflected by surface 242 or 244 experiences TIR at light-exit surface 246 or 248. For certain spherical or cylindrical structures, a so-called Weierstrass condition can avoid TIR. A Weierstrass condition is illustrated for a circular structure (i.e., a cross section through a cylinder or sphere) having a surface of radius R and a concentric notional circle having a radius R/n, where n is the refractive index of the structure. Any light ray that passes through the notional circle within the cross-sectional plane is incident on the surface of the circular structure and has an angle of incidence less than the critical angle and will exit the circular structure without experiencing TIR. Light rays propagating within the spherical structure in the plane but not emanating from within notional surface can impinge on the surface of radius R at the critical angle or greater angles of incidence. Accordingly, such light may be subject to TIR and won't exit the circular structure. Furthermore, rays of p-polarized light that pass through a notional space circumscribed by an area with a radius of curvature that is smaller than $R/(1-n^2)^{(-1/2)}$, which is smaller than R/n, will be subject to small Fresnel reflection at the surface of radius R when exiting the circular structure. This condition may be referred to as Brewster geometry. Implementations may be configured accordingly.

Referring again to FIG. 2A, in some implementations, all or part of surfaces 242 and 244 may be located within a notional Weierstrass surface defined by surfaces 246 and 248. For example, the portions of surfaces 242 and 244 that receive light exiting light guide 230 through end 232 can reside within this surface so that light within the x-z plane reflected from surfaces 242 and 244 exits through surfaces 246 and 248, respectively, without experiencing TIR.

FIG. 2E shows an embodiment 200' of the luminaire module 200 that also is elongated along an axis (e.g., y-axis) perpendicular to the forward direction (e.g., along the z-axis.) In this case, a length L of the light guide 230 along the elongated dimension of the luminaire module 200' can be 2', 4' or 8', for instance. A thickness T of the light guide 230 orthogonal to the elongated dimension L (e.g., along the x-axis) is chosen to be a fraction of the distance D traveled by the guided light from the receiving end to the opposing end of the light guide 230. For T=0.05 D, 0.1 D or 0.2 D, for instance, light from multiple, point-like LEEs 210—distributed along the elongated dimension L—that is edge-coupled into the light guide 230 at the receiving end can efficiently mix and become uniform (quasi-continuous) along the y-axis by the time it propagates to the opposing end.

FIG. 2F shows a luminaire module 200" that has (e.g., continuous or discrete) rotational symmetry about the forward direction (e.g., z-axis.) Here, a diameter T of the light guide 230 is a fraction of the distance D traveled by the guided light from the receiving end to the opposing end of the light guide 230. For example, the diameter of the light guide 230 can be T=0.05 D, 0.1 D or 0.2 D, for instance.

Other open and closed shapes of the luminaire module 200 are possible. FIGS. 2G and 2H show a perspective view and a bottom view, respectively, of a luminaire module 200''' for which the light guide 230 has two opposing side surfaces 232a, 232b that form a closed cylinder shell of thickness T. In the example illustrated in FIGS. 2G and 2H, the x-y cross-section of the cylinder shell formed by the opposing side surfaces 232a, 232b is oval. In other cases, the x-y cross-section of the cylinder shell can be circular or can have other shapes. Some implementations of the example luminaire module 200''' may include a specular reflective coating on the side surface 232a of the light guide 230. For T=0.05 D, 0.1 D or 0.2 D, for instance, light from multiple, point-like LEEs 210—distributed along an elliptical path of length L—that is edge-coupled into the light guide 230 at the receiving end can efficiently mix and become uniform (quasi-continuous) along such an elliptical path by the time it propagates to the opposing end.

Figure 2I:
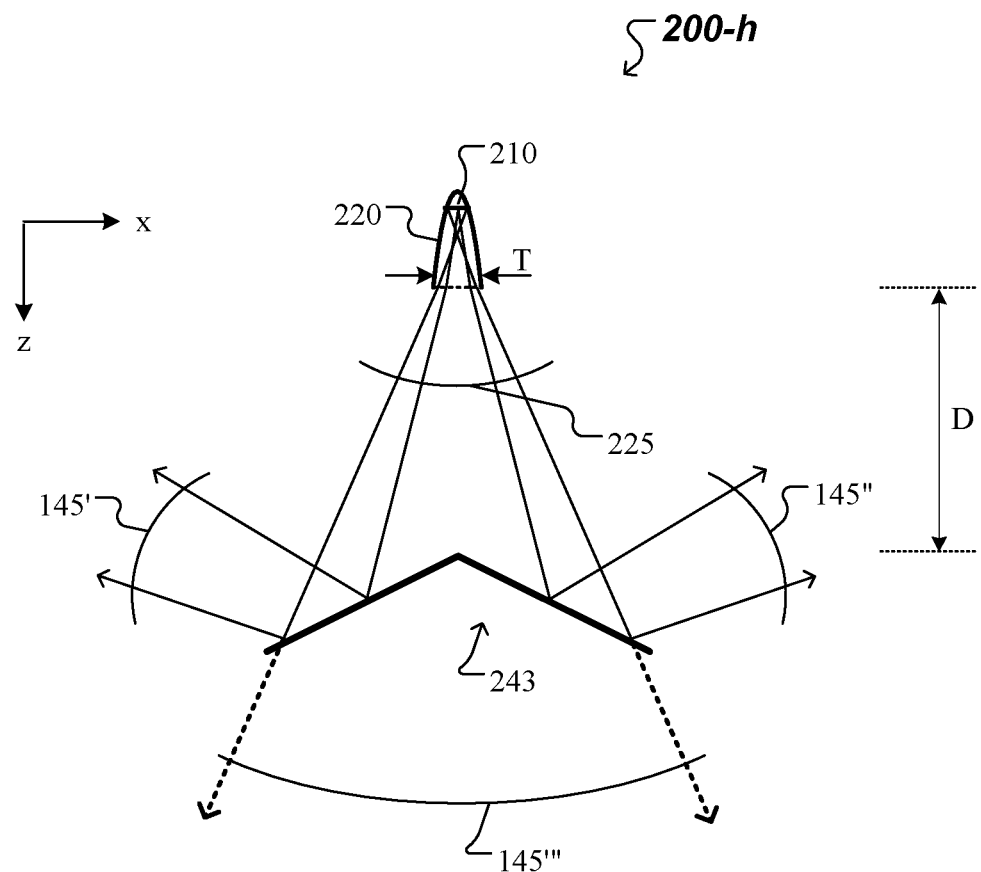

In the example implementations described above in connection with FIGS. 2A-2H, the luminaire module 200 includes a light guide 230 to guide (translate) light from the exit aperture of the optical couplers 220 to the input end 231' of the optical extractor 240. FIG. 2I illustrates an example of such "hollow" luminaire module 200-h that includes LEEs 210, one or more corresponding optical couplers 220 (like the luminaire module 200) and an optical extractor (simplified relative to the optical extractor 240 of the luminaire module 200) that uses only a redirecting surface 243 to extract—to the ambient environment—the light provided by the optical couplers 220. The hollow luminaire module 200-h is elongated along the y-axis like the luminaire module 200 shown in FIG. 2A. Also like the luminaire module 200, the hollow luminaire module 200-h includes a mount 212 (having a normal along the z-axis) such that the LEEs 210 are disposed on a surface of the mount 212 along the y-axis to emit light in a first angular range along the z-axis. The optical couplers 220 are arranged and configured to redirect the light emitted by the LEEs 210 in the first angular range into a second angular range 125 that has a divergence smaller than the divergence of the first angular range at least in the x-z cross-section.

Here, the redirecting surface 243 is spaced apart from an exit aperture of the optical couplers 220 by a distance D and includes two reflecting surfaces arranged to form a v-groove with an apex pointing toward the optical couplers 220. The distance D is selected based on a divergence of the second angular range 225 and of a transverse dimension (along the x-axis) of the redirecting surface 243, such that all light provided by the optical couplers in the second angular range 225 impinges on the redirecting surface 243. In this manner, a portion of the redirecting surface 243 redirects some of the light received from the optical couplers 220 into a third angular range 138' and another portion of the redirecting surface 243 redirects the remaining light received from the optical couplers 220 into a fourth angular range 138. In some cases, the redirecting surface 243 is semitransparent. In this manner, a fraction of the light received from the optical couplers 220 in angular range 225 is transmitted (leaks) through the redirecting surface 243 in a fifth angular range 225'. A prevalent propagation direction for the fifth angular range 225' is in the forward direction (along the z-axis.) A light intensity profile of the hollow luminaire module 200-h can be represented similar to the one shown in FIG. 1F as first 145a and second 145c output lobes, and optionally as an additional second output lobe 145c. By comparison, the first output lobe 145a corresponds to light output by the hollow luminaire module 200-h in the backward third angular range 145', the second output lobe 145c corresponds to light leaked by the hollow luminaire module 200-h in the forward fifth angular range 145''', and the third output lobe 145b corresponds to light output by the hollow luminaire module 200-h in the backward fourth angular range 145".

Figure 2J:
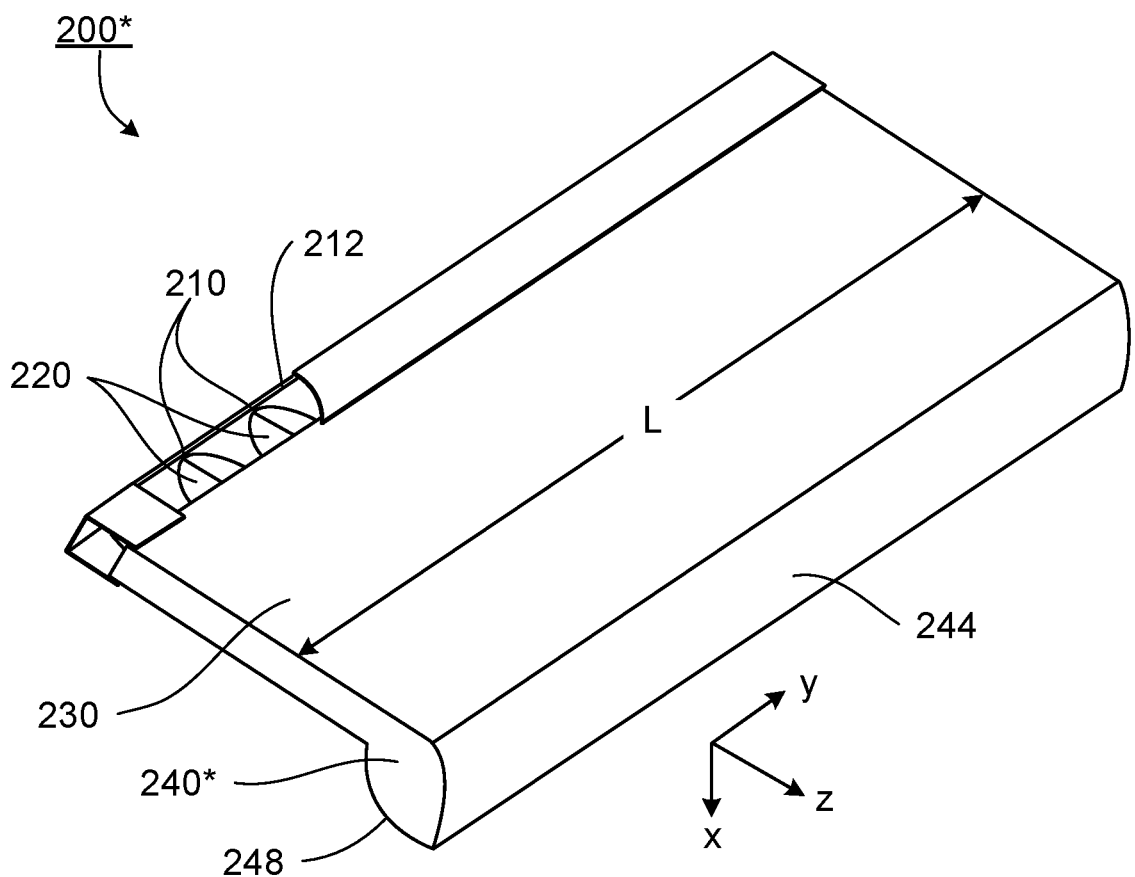

In the example implementations described above in connection with FIG. 2A, the luminaire module 200 is configured to output light into output angular ranges 145' and 145". In other implementations (e.g., see FIG. 2J), the light guide-based luminaire module is modified to output light into a single output angular range 145'. Such light guide-based luminaire module configured to output light on a single side of the light guide is referred to as a single-sided luminaire module and is denoted 200*. The single-sided luminaire module 200* is elongated along the y-axis like the luminaire module 200 shown in FIG. 2A. Also like the luminaire module 200, the single-sided luminaire module 200* includes a mount 212 and LEEs 210 disposed on a surface of the mount 212 along the y-axis to emit light in a first angular range. The single-sided luminaire module 200* further includes optical couplers 220 arranged and configured to redirect the light emitted by the LEEs 210 in the first angular range into a second angular range 125 that has a divergence smaller than the divergence of the first angular range at least in the x-z cross-section. Also, the single-sided luminaire module 200* includes a light guide 230 to guide the light redirected by the optical couplers 220 in the second angular range 125 from a first end 231 of the light guide to a second end 232 of the light guide. Additionally, the single-sided luminaire module 200* includes a single-sided extractor (denoted 240*) to receive the light guided by the light guide 230. The single-sided extractor 240* includes a redirecting surface 244 to redirect the light received from the light guide 230 into a third angular range 138', like described for luminaire module 200 with reference to FIG. 2A, and an output surface 248 to output the light redirected by the redirecting surface 244 in the third angular range 138' into a fourth angular range 145'.

A light intensity profile of the single-sided luminaire module 200* is represented in FIG. 1B as a first output lobe 145a and the second output lobe 145c. The first output lobe 145a corresponds to light output by the single-sided luminaire module 200* in the fourth angular range 145' and the second output love 145c corresponds to light transmitted (leaked) by the single-sided luminaire module 200* in the forward direction (along the z-axis.)

Luminaire modules like the ones described in this section—which include an optical extractor with a redirecting surface having light transmitting portions—can be used to obtain luminaire modules for which the optical extractor with a redirecting surface having light transmitting portions also has optical elements coupled with the light transmitting portions to modify the transmitted light.

(iii) Illumination Device that Includes an Optical Extractor with a Redirecting Surface Having Light Transmitting Portions and Optical Elements Coupled with the Light Transmitting Portions to Modify a Spectral Distribution of the Transmitted Light FIGS. 3A-3D show aspects of an illumination device 300 that includes an optical extractor 340-j, with j={a or b}, with a redirecting surface 343 having light transmitting portions and optical elements 344 coupled with the light transmitting portions to modify a spectral distribution of the transmitted light. In this example, the illumination device 300 also includes LEEs (not shown in FIGS. 3A-3B) and a light guide 230. As such, the illumination device 300 is referred to, interchangeably, as a light guide luminaire module 300. Here, the illumination device 300 has an elongated configuration, e.g., with a longitudinal dimension L along the y-axis, perpendicular to the page, as illustrated in FIG. 2A or 2E. In this case, L can be 1', 2' or 4', for instance. In other implementations, the illumination device 300 can have another elongated configuration, as illustrated in FIGS. 2G-2H. In some other implementations, the illumination device 300 can have a non-elongated configuration, e.g., with rotational symmetry around the z-axis, as illustrated in FIG. 2F. In some implementations, the illumination device 300 also includes one or more couplers (not shown in FIGS. 3A-3B) to collimate the light emitted by the LEEs prior to injection into the light guide 230.

The LEEs are disposed on a substrate and have a structure similar to a structure of the LEEs 110 of the illumination device 100 described above in connection with FIG. 1A or a structure of the LEEs 210 of the luminaire modules 200, 200*, 200', 200", 200''', 200-h described above in connection with FIGS. 2A-2J. Further, the optical couplers—included in some implementations of the illumination device 300—have a structure similar to a structure of the optical couplers 120 of the illumination device 100 described above in connection with FIG. 1A or a structure of the optical couplers 220 of the luminaire modules 200, 200*, 200', 200", 200''', 200-h described above in connection with FIGS. 2A-2J. Furthermore, the light guide 230 is the same light guide of the luminaire modules 200, 200*, 200', 200", 200''' described above in connection with FIGS. 2A-2H and 2J or has a structure similar to a structure of the light guide 130 of the illumination device 100 described above in connection with FIG. 1A. Here, the light guide 230 has a length D along the z-axis, e.g., D=10, 20, 50 cm, from a receiving end to an opposing end, and a thickness T along the x-axis that can be much smaller than the length D, e.g., T≈5% D, 10% D or 20% D. When part of the illumination device 300, the optical couplers are optically coupled to the input end of the light guide 230. In some implementations, the optical couplers are bonded to the input end of the light guide 230. In other implementations, the optical couplers and the light guide 230 are integrally formed.

Figure 3A:
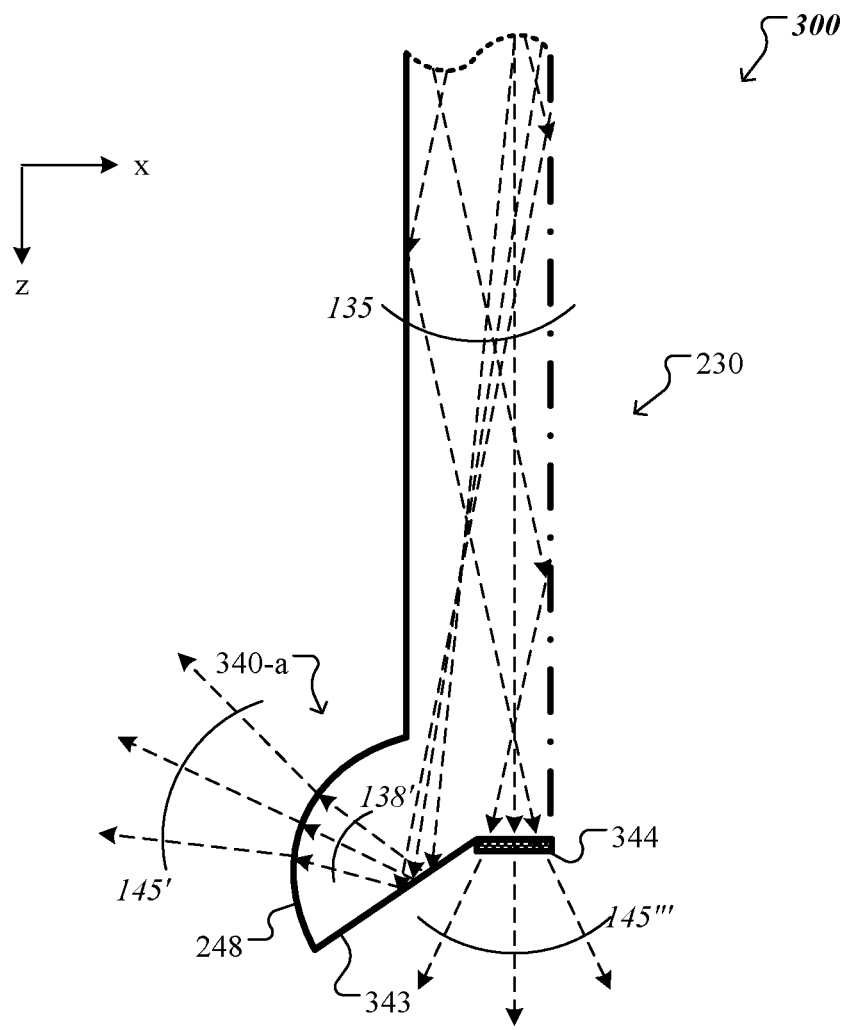
FIGS. 3A-3D show aspects of a light guide luminaire module that includes an optical extractor with a redirecting surface having light transmitting portions and optical elements coupled with the light transmitting portions to modify a spectral distribution of the transmitted light.
Figure 3B:
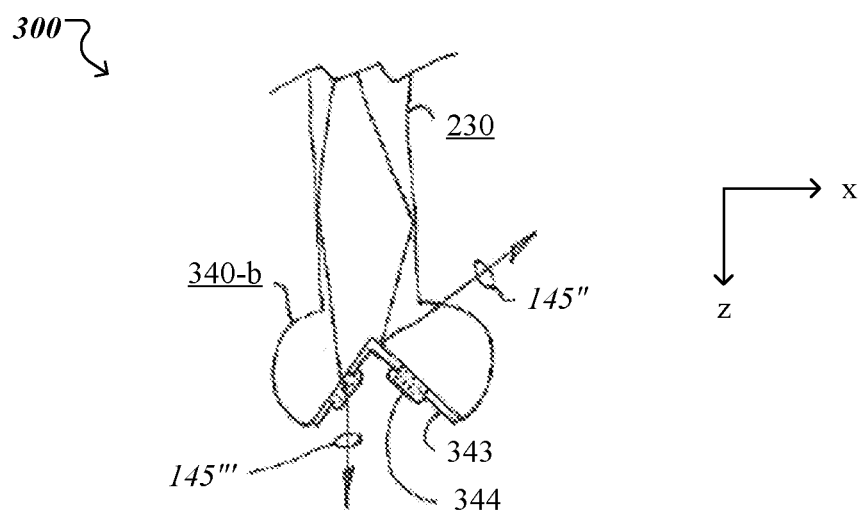

FIGS. 3A and 3B show respective implementations 340-a and 340-b of the optical extractor. The optical extractor 340-a or the optical extractor 340-b includes a redirecting surface 343 having a structure similar to a structure of the redirecting surface 143 of the optical extractor 140' of the illumination device 100 described above in connection with FIGS. 1B-1C or the redirecting surfaces 243 of the optical extractors 240, 240* of the luminaire modules 200, 200*, 200', 200", 200''', 200-h described above in connection with FIGS. 2A-2J. The redirecting surface 343 of the optical extractor 340-a is configured like the redirecting surface 243 illustrated in FIG. 2B. The redirecting surface 343 of the optical extractor 340-b is configured like the redirecting surface 243 illustrated in FIGS. 2C-2D. Here, the "v-groove" redirecting surface 343 is coated with a reflective (metallic or dielectric) film and each of the two sides (which, in FIG. 2C-2D, are labeled 242 and 244 and meet at an apex 241) of the redirecting surface 343 has one or more transmissive portions located on the side. The transmissive portions of the redirecting surface 343 of either the optical extractor 340-a or the optical extractor 340-b represent a slot, a void or an opening in the reflective film that coats the redirecting surface. In this manner, the transmissive portions transmit substantially all light impinging thereon, except for a small fraction of the impinging light, e.g., 4% or less, that is reflected via Fresnel reflection, for instance.

Figure 3C:
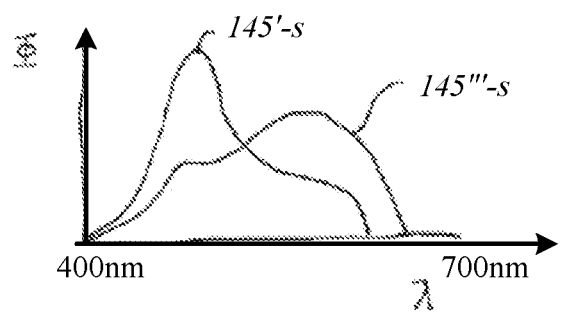

The optical extractor 340-a or the optical extractor 340-b also includes light modifying elements 344 that are optically coupled with the light transmitting portions of the redirecting surface 343. Here, the light modifying elements 344 are configured to modify a spectral distribution of the light transmitted through the transmissive portions of the redirecting surface 343. Hence, the light modifying elements 344 include inelastic scattering centers such that the modified light provided by the light modifying elements 344 of the optical extractor 340-a or the optical extractor 340-b has a spectral distribution different from a spectral distribution of light emitted by the LEEs and guided by the light guide 230 to the redirecting surface 343. FIG. 3C shows an example of a spectrum 145'-s corresponding to the light emitted by the LEEs and guided by the light guide 230 to the redirecting surface 343. Also shown in FIG. 3C is an example of a spectrum 145'''-s corresponding to light transmitted through the transmissive portions of the redirecting surface 343, modified by the light modifying elements 344 and directed in the forward angular range 145''' as spectrally modified light.

In this manner, the optical extractor 340-a or the optical extractor 340-b outputs, into the ambient environment, light—reflected by portions of the redirecting surface 343 outside the transmissive portions—in one or more backward angular ranges 145' and 145". Additionally, the light that is spectrally modified by the light modifying elements 344 coupled with the transmissive portions of the redirecting surface 343 is output by the optical extractor 340-a or the optical extractor 340-b within a forward output angular range 145'''. Here, propagation directions of light in the backward angular ranges 145', 145" have components that are antiparallel to the forward direction (e.g., the z-axis) and a propagation direction of spectrally modified light in the forward angular range 145''' has a component parallel to the forward direction. Moreover, the propagation directions of the light in the backward angular ranges 145' and 145" have respective components orthogonal to the forward direction that are opposite (antiparallel) to each other (antiparallel and parallel to the x-axis.)

Figure 3D:
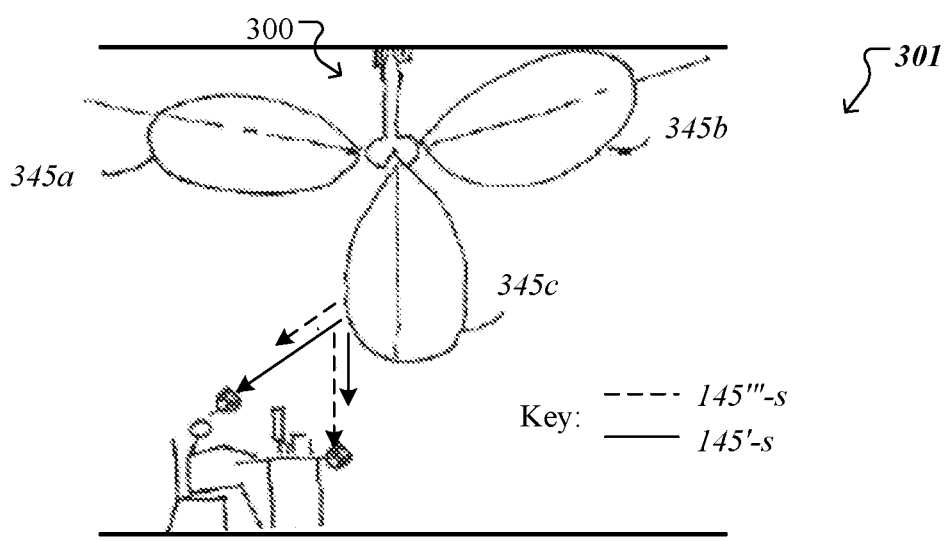

FIG. 3D shows a modified far-field light intensity profile 301 of the illumination device 300. Here the illumination device 300 is affixed to the ceiling of a room and is configured to provide direct and indirect illumination to a target surface (e.g., a user's desk). The direct, or task, illumination is provided from light in downward lobe 345c corresponding to modified light having a spectrum 145'''-s that is being output in the forward angular range 145'''. The indirect illumination is provided from light in upward lobes 345a, 345b corresponding to unmodified light having a spectrum 145'-s that is being output in the backward angular ranges 145' and 145". The unmodified light provided from light in upward lobes 345a, 345b directly illuminates the ceiling, such that the unmodified light scattered off the ceiling reaches the target surface as indirect illumination.

As shown in FIG. 3C, the spectrum 145'-s of the unmodified light—that is output by the illumination device 300 towards the ceiling—contains a higher relative amount of shorter wavelengths relative to the spectrum 145'''-s of the modified light—that is output by the illumination device 300 directly towards the target surface. In this manner, light reaching the target surface can be optimized for biological purposes in terms of spectral content and preferred field of view direction to increase the biological efficacy for human circadian rhythm. As shown in literature, the location of the retinal ganglion cells is not uniform within the human eye and have evolved to be pre-disposed to receiving and acting on particular wavelengths of light within certain zones above a horizontal field of view, as in sunlight above the horizon and the overall blue sky radiation. Therefore, the illumination device 300 may be well suited to the optimal distribution of biologically active illumination above the horizontal field of view via a combination of both reflections/scattering from the ceiling and some level of direct illumination from the optical extractor 340-$a$ or the optical extractor 340-$b$. As such, a lower correlated color temperature as could be potentially preferred for a "down-light" component of illumination, can be provided by the illumination device 300 for task illumination within the working space below.

As described above, the light modifying elements 344 include inelastic scattering centers—formed from light converting materials, e.g., phosphor or quantum dots, which will and re-radiate optical radiation at a different wavelength, usually longer than the incident wavelength—such that the correlated color temperature of modified light with spectrum 145'''-$s$ has a "warmer" than the unmodified light with spectrum 145'-$s$. Various types of binder material may be used to protect the phosphor and to hold it mechanically in place. Other structures could be used including thin layers of sintered phosphor powder as in Lumiramic™ as described by Philips Lumileds. Alternatively, the use of quantum dots could be very well suited in this application as they also potentially limit the amount of scattering within the light modifying elements 344, as quantum dots are typically smaller than phosphor particles. Thus a range of downward optical profiles could be achieved with a careful selection of light converting material and, optionally, appropriately shaped optical elements, e.g., lenses, micro-lenses, etc. The relative sizes of the continuous arrow and dashed arrow in FIG. 3D conveys how the ratio of unmodified/modified light is weighted for the intensity distribution 301. Namely, the foregoing ratio for the upper range of the viewer's field of view is reversed relative to the ratio towards the task plane on the desk, which may potentially improve the viewing aesthetics or preferences of various users.

Furthermore, additional light modifying elements, such as the ones disclosed below, can also be incorporated into the optical extractor 340-$a$ or the optical extractor 340-$b$ of the illumination device 300 to modify shape and orientation of the lobes 345$a$, 345$b$ of unmodified light relative to each other and to shape and orientation of the lobe 345$c$ of modified light.

Figure 4A:
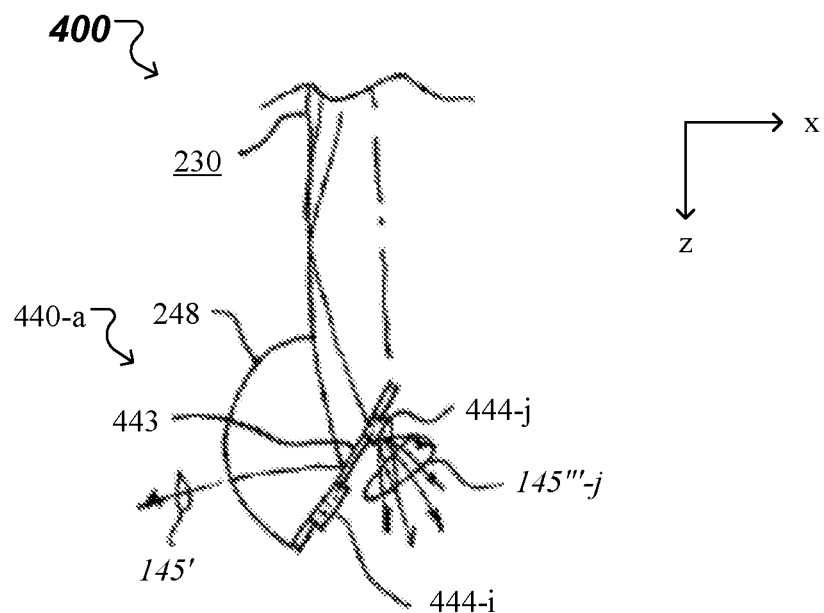
FIGS. 4A-4B show aspects of a light guide luminaire module that includes an optical extractor with a redirecting surface having light transmitting portions and optical elements coupled with the light transmitting portions to modify an intensity distribution of the transmitted light.
Figure 4B:
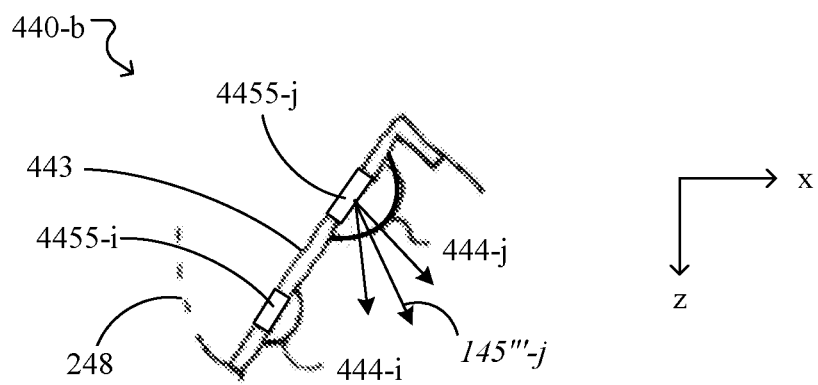

(iv) Illumination Device that Includes an Optical Extractor with a Redirecting Surface Having Light Transmitting Portions and Optical Elements Coupled with the Light Transmitting Portions to Modify an Intensity Distribution of the Transmitted Light FIGS. 4A-4B show aspects of an illumination device 400 that includes an optical extractor 440-$k$, with k={a or b}, with a redirecting surface 443 having light transmitting portions and optical elements 444 coupled with the light transmitting portions to modify an intensity distribution of the transmitted light. In this example, the illumination device 400 also includes LEEs (not shown in FIGS. 4A-4B) and a light guide 230. As such, the illumination device 400 is referred to, interchangeably, as a light guide luminaire module 400. Here, the illumination device 400 has an elongated configuration, e.g., with a longitudinal dimension L along the y-axis, perpendicular to the page, as illustrated in FIG. 2A or 2E. In this case, L can be 1', 2' or 4', for instance. In other implementations, the illumination device 400 can have another elongated configuration, as illustrated in FIGS. 2G-2H. In some other implementations, the illumination device 400 can have a non-elongated configuration, e.g., with rotational symmetry around the z-axis, as illustrated in FIG. 2F. In some implementations, the illumination device 400 also includes one or more couplers (not shown in FIGS. 4A-4B) to collimate the light emitted by the LEEs prior to injection into the light guide 230.

The LEEs are disposed on a substrate and have a structure similar to a structure of the LEEs 110 of the illumination device 100 described above in connection with FIG. 1A or a structure of the LEEs 210 of the luminaire modules 200, 200*, 200', 200", 200''', 200-$h$ described above in connection with FIGS. 2A-2J. Further, the optical couplers—included in some implementations of the illumination device 400—have a structure similar to a structure of the optical couplers 120 of the illumination device 100 described above in connection with FIG. 1A or a structure of the optical couplers 220 of the luminaire modules 200, 200*, 200', 200", 200''', 200-$h$ described above in connection with FIGS. 2A-2J. Furthermore, the light guide 230 is the same light guide of the luminaire modules 200, 200*, 200', 200", 200''' described above in connection with FIGS. 2A-2H and 2J or has a structure similar to a structure of the light guide 130 of the illumination device 100 described above in connection with FIG. 1A. Here, the light guide 230 has a length D along the z-axis, e.g., D=10, 20, 50 cm, from a receiving end to an opposing end, and a thickness T along the x-axis that can be much smaller than the length D, e.g., T≈5% D, 10% D or 20% D. When part of the illumination device 400, the optical couplers are optically coupled to the input end of the light guide 230. In some implementations, the optical couplers are bonded to the input end of the light guide 230. In other implementations, the optical couplers and the light guide 230 are integrally formed.

FIGS. 4A and 4B show respective implementations 440-$a$ and 440-$b$ of the optical extractor. The optical extractor 440-$a$ or the optical extractor 440-$b$ includes a redirecting surface 443 having a structure similar to a structure of the redirecting surface 143 of the optical extractor 140' of the illumination device 100 described above in connection with FIGS. 1B-1C or the redirecting surfaces 243 of the optical extractors 240, 240* of the luminaire modules 200, 200*, 200', 200", 200''', 200-$h$ described above in connection with FIGS. 2A-2J. Here, the redirecting surface 443 of the optical extractor 440-$a$ or the optical extractor 440-$b$ is configured like the redirecting surface 243 illustrated in FIGS. 2C-2D. Here, the "v-groove" redirecting surface 443 is coated with a reflective (metallic or dielectric) film and each of the two sides (which, in FIG. 2C-2D, are labeled 242 and 244 and meet at an apex 241) of the redirecting surface 443 has one or more transmissive portions located on the side. The transmissive portions of the redirecting surface 443 of either the optical extractor 440-$a$ or the optical extractor 440-$b$ represent a slot, a void or an opening in the reflective film that coats the redirecting surface. In this manner, the transmissive portions transmit substantially all light impinging thereon, except for a small fraction of the impinging light, e.g., 4% or less, that is reflected via Fresnel reflection, for instance.

The optical extractor 440-*a* or the optical extractor 440-*b* also includes light modifying elements 444 that are optically coupled with the light transmitting portions of the redirecting surface 443. Here, the light modifying elements 444 are configured to modify an intensity distribution of the light transmitted through the transmissive portions of the redirecting surface 443.

In some implementations shown in FIG. 4A, the light modifying elements 444 include elastic scattering centers arranged in a particular pattern to scatter in a controlled way that light propagating through the light modifying elements 444. In some cases, the particular pattern is a 2D pattern of elastic scattering centers disposed on a surface of the light transmitting portions of the redirecting surface 443. In other cases, the particular pattern is a 3D pattern of elastic scattering centers disposed within a matrix of transparent material, where the matrix is attached to the surface of the light transmitting portions of the redirecting surface 443. FIG. 4A shows a redirecting surface 443 having N transmissive portions distributed along a transverse direction of the optical extractor 440-*a* from the intersection of the redirecting surface 443 with the curved output surface 248 to the apex of the v-groove-shaped redirecting surface 443. Here, N light modifying elements 444-*j*, where j=1 . . . N, that include the patterned elastic scattering centers are connected to the N transmissive portions of the redirecting surface 443. For example, the pattern of elastic scattering centers can be the same for each of the N light modifying elements 444-*j*, where j=1 . . . N. Here, each of the N light modifying elements 444-*j* distributed across the redirecting surface 443 modifies a propagation direction and/or a divergence of light transmitting through associated transmissive portions in the same manner. As another example, the pattern of elastic scattering centers of at least a pair of light modifying elements 444-*i* and 444-*j*, where and j=1 . . . N, can be different. Here, at least the pair of light modifying elements 444-*i* and 444-*j* changes the propagation direction and/or the divergence of the light transmitting through the associated transmissive portions in different ways.

In other implementations shown in FIG. 4B, the light modifying elements 444 include lens structures, e.g., micro-lenses, Fresnel lenses, etc., where the lens structures are attached to the surface of the light transmitting portions of the redirecting surface 443. FIG. 4B shows a redirecting surface 443 having N transmissive portions 4455-*j*, where j=1 . . . N, distributed along a transverse direction of the optical extractor 440-*b* from the intersection of the redirecting surface 443 with the curved output surface 248 to the apex of the v-groove-shaped redirecting surface 443. Here, N micro-lenses 444-*j* are connected to the N transmissive portions 4455-*j* of the redirecting surface 443. For example, a focal length F-j can be the same for each of the N micro-lenses 444-*j*, where j=1 . . . N. Here, each of the N micro-lenses 444-*j* distributed across the redirecting surface 443 changes a propagation direction and/or a divergence of light transmitting through associated transmissive portions 4455-*j* in the same manner. As another example, the focal lengths F-i and F-j of at least a pair of micro-lenses 444-*i* and 444-*j*, where i≠j and j=1 . . . N, can be different. Here, at least the pair of micro-lenses 444-*i* and 444-*j* changes the propagation direction and/or the divergence of the light transmitting through the associated transmissive portions 4455-*j* in different ways.

In some other implementations, the light modifying elements 444 include combinations of a pattern of elastic scattering centers and lens structures. For example, a matrix of transparent material that includes elastic scattering centers arranged in a particular 3D pattern to controllably scatter the light propagating through the pattern has first and second surfaces. The first surface of the matrix is attached to the surface of the light transmitting portions of the redirecting surface 443, and a micro-lens is attached to the second surface of the matrix. In this manner, the light transmitted through the transmissive portions is first controllably scattered by the particular pattern of elastic scattering centers and it is then further focused/defocused by the micro-lens.

In either of these implementations, each of the N modifying elements 444-*j* outputs modified light in a segment angular range 145'''-*j*, where j=1 . . . N. The forward angular range 145''' output by the optical extractor 440-*a* or the optical extractor 440-*b* is a composite angular range formed from the N segment angular ranges 145'''-*j*, where j=1 . . . N. Near-field distributions of the flux Φ145''' or peak-intensity θ145''' corresponding to all N segment angular ranges 145'''-*j*, where j=1 . . . N, across the transverse dimension (e.g., along the x-axis) of the optical extractor 440-*a* or the optical extractor 440-*b*, are represented in FIGS. 1D and 1E. A superposition of the near-field distributions of the flux Φ145''' or peak-intensity θ145''' corresponding to all N segment angular ranges 145'''-*j* determines the shape and orientation of the forward output lobe 145*c* of the far-field intensity distribution 101 illustrated in FIG. 1F.

In this manner, the optical extractor 440-*a* or the optical extractor 440-*b* outputs, into the ambient environment, light—reflected by portions of the redirecting surface 443 outside the transmissive portions—in one or more backward angular ranges 145' and 145". Additionally, the light having light intensity (propagation direction and/or divergence) modified by the light modifying elements 444 coupled with the transmissive portions of the redirecting surface 443 is output by the optical extractor 440-*a* or the optical extractor 440-*b* within a forward output angular range 145'''. Here, propagation directions of the unmodified light in the backward angular ranges 145', 145" have components that are antiparallel to the forward direction (e.g., the z-axis) and a propagation direction of the modified light in the forward angular range 145''' has a component parallel to the forward direction. Moreover, the propagation directions of the unmodified light in the backward angular ranges 145' and 145" have respective components orthogonal to the forward direction that are opposite (antiparallel) to each other (antiparallel and parallel to the x-axis.)

Figure 5:
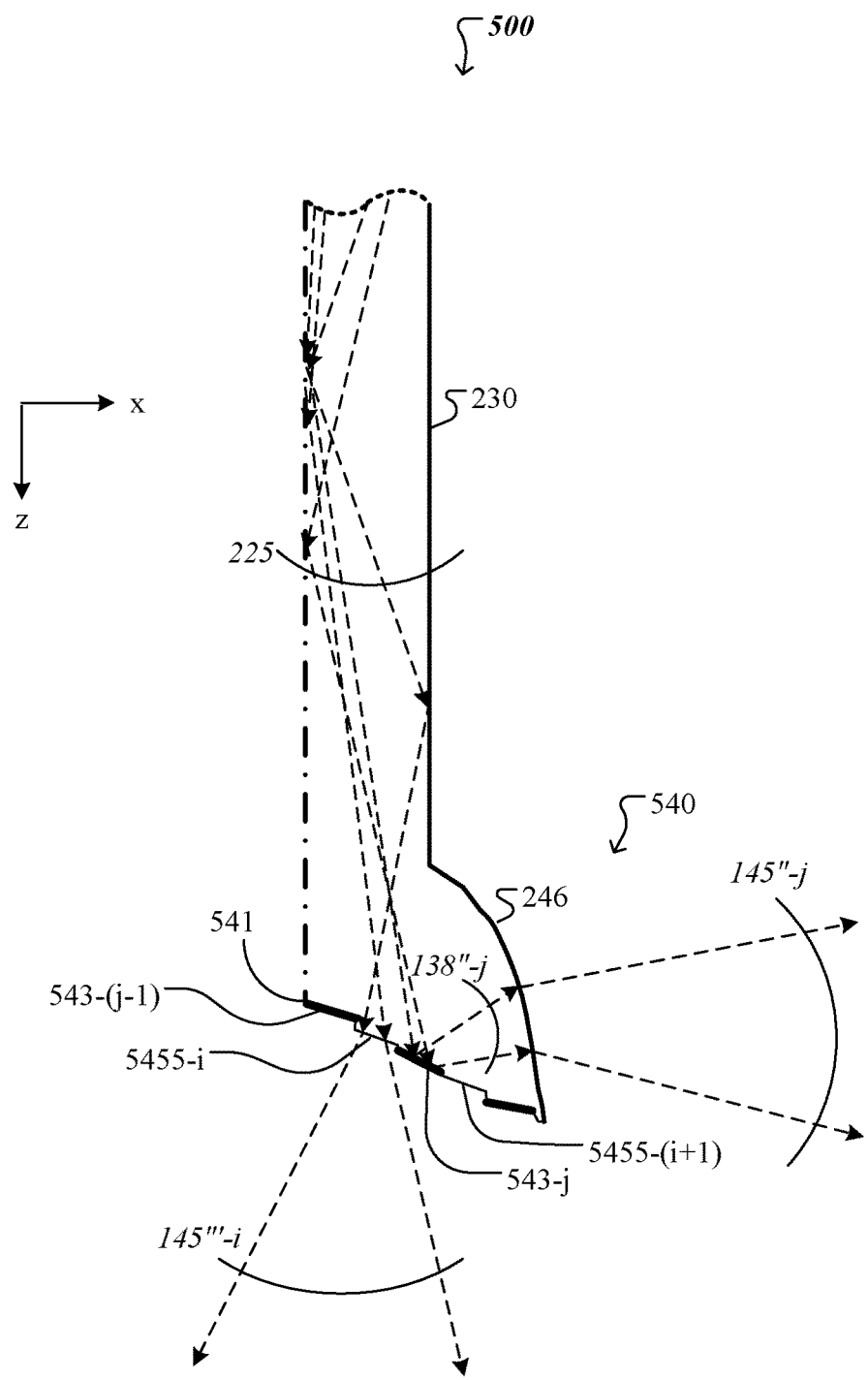
FIG. 5 shows a light guide luminaire module that includes an optical extractor with a redirecting surface having light transmitting portions shaped such that each transmissive surface modifies at least an associated propagation direction or an associated divergence of the forward transmitted light in a different manner relative to adjacent transmissive surfaces.

(v) Light Guide Illumination Device that Includes an Optical Extractor with a Redirecting Surface Having Light Transmitting Portions Such that Adjacent Transmitting Portions are Configured Differently FIG. 5 shows an example of an illumination device 500 that includes an optical extractor 540 with a redirecting surface 543 having light transmitting portions 5455-*i*, i=1 . . . N, such that adjacent transmitting portions 5455-*i* and 5455-(*i*+1) are configured differently. In this example, the illumination device 500 also includes LEEs (not shown in FIG. 5) and a light guide 230. As such, the illumination device 500 is referred to, interchangeably, as a light guide luminaire module 500. Here, the illumination device 500 has an elongated configuration, e.g., with a longitudinal dimension L along the y-axis, perpendicular to the page, as illustrated in FIG. 2A or 2E. In this case, L can be 1', 2' or 4', for instance. In other implementations, the illumination device 500 can have another elongated configuration, as illustrated in FIGS. 2G-2H. In some other implementations, the illumination device 500 can have a non-elongated configuration, e.g., with rotational symmetry around the z-axis, as illustrated in FIG. 2F. In some implementations, the illumination device 500 also includes one or more couplers (not shown in FIG. 5) to collimate the light emitted by the LEEs prior to injection into the light guide 230.

The LEEs are disposed on a substrate and have a structure similar to a structure of the LEEs 110 of the illumination device 100 described above in connection with FIG. 1A or a structure of the LEEs 210 of the luminaire modules 200, 200*, 200', 200", 200''', 200-$h$ described above in connection with FIGS. 2A-2J. Further, the optical couplers—included in some implementations of the illumination device 300—have a structure similar to a structure of the optical couplers 120 of the illumination device 100 described above in connection with FIG. 1A or a structure of the optical couplers 220 of the luminaire modules 200, 200*, 200', 200", 200''', 200-$h$ described above in connection with FIGS. 2A-2J. Furthermore, the light guide 230 is the same light guide of the luminaire modules 200, 200*, 200', 200", 200''' described above in connection with FIGS. 2A-2H and 2J or has a structure similar to a structure of the light guide 130 of the illumination device 100 described above in connection with FIG. 1A. Here, the light guide 230 has a length D along the z-axis, e.g., D=10, 20, 50 cm, from a receiving end to an opposing end, and a thickness T along the x-axis that can be much smaller than the length D, e.g., T≈5% D, 10% D or 20% D. When part of the illumination device 500, the optical couplers are optically coupled to the input end of the light guide 230. In some implementations, the optical couplers are bonded to the input end of the light guide 230. In other implementations, the optical couplers and the light guide 230 are integrally formed.

The optical extractor 540 includes a redirecting surface 543 that is v-grooved. The v-groove profile of the redirecting surface 543 includes two sides that intersect at an apex 541. Only one of the two sides of the redirecting surface 543 is shown in FIG. 5, the one extending from the apex 541 to the intersection of the redirecting surface 543 with the curved output surface 246. The other side of the redirecting surface 543 is disposed on the opposite side of an optical axis that passes through the apex along the z-axis. In some implementations, the two sides of the redirecting surface 543 are symmetric. In other implementations, the two sides of the redirecting surface 543 are asymmetric.

Moreover, the redirecting surface 543 is coated with a reflective (metallic or dielectric) and has N transmissive portions 5455-$i$, where i=1 . . . N, distributed across the transverse dimension (along the x-axis) of the extractor 540. Each of the transmissive portions 5455-$i$ of the redirecting surface 543 represent a slot, a void or an opening in the reflective film that coats the redirecting surface 543. In this manner, the transmissive portions transmit substantially all light impinging thereon, except for a small fraction of the impinging light, e.g., 4% or less, that is reflected via Fresnel reflection, for instance. In this manner, the redirecting surface 543 includes M reflective portions 543-$j$, where j=1 . . . M and M={N−1, N or N+1}, distributed across the transverse dimension (along the x-axis) of the extractor 540. A pair of adjacent reflective portions 543-$(j-1)$ and 543-$j$ are separated by a transmissive portion 5455-$i$, or equivalently, a pair of adjacent transmissive portions 5455-$i$ and 5455-$(i+1)$ is separated by a reflective portion 543-$j$.

In some implementations, at least a pair of adjacent transmissive portions 5455-$i$ and 5455-$(i+1)$ are arranged and/or shaped differently. For example, each of the adjacent transmissive portions 5455-$i$ and 5455-$(i+1)$ of a pair can be flat and non-parallel (tilted relative one another.) As another example, a transmissive portion 5455-$i$ is flat and the adjacent transmissive portion 5455-$(i+1)$ is curved. As yet another example, a transmissive portion 5455-$i$ has a first curvature and the adjacent transmissive portion 5455-$(i+1)$ has a different curvature. Here, the adjacent transmissive portions 5455-$i$ and 5455-$(i+1)$ that are arranged and/or shaped differently are formed on different facets of the redirecting surface 543 of the optical extractor 540. Moreover, each of the N transmissive portions 5455-$i$ transmits into the ambient environment light in a segment angular range 145'''-$i$, where i=1 . . . N. The forward angular range 145''' output by the optical extractor 540 is a composite angular range formed from the N segment angular ranges 145'''-$i$, where i=1 . . . N. Near-field distributions of the flux Φ145''' or peak-intensity θ145''' corresponding to all N segment angular ranges 145'''-$i$, where i=1 . . . N, across the transverse dimension (e.g., along the x-axis) of the optical extractor 540, are represented in FIGS. 1D and 1E. A superposition of the near-field distributions of the flux Φ145''' or peak-intensity θ145''' corresponding to all N segment angular ranges 145'''-$i$ advantageously determines the shape and orientation of the forward output lobe 145$c$ of the far-field intensity distribution 101 illustrated in FIG. 1F.

In some implementations, at least a pair of adjacent reflective portions 543-$(j-1)$ and 543-$j$ are arranged and shaped differently. For example, each of the adjacent reflective portions 543-$(j-1)$ and 543-$j$ of a pair can be flat and non-parallel (tilted relative one another.) As another example, a reflective portion 543-$(j-1)$ is flat and the adjacent reflective portion 543-$j$ is curved. As yet another example, a reflective portion 543-$(j-1)$ has a first curvature and the adjacent reflective portion 543-$j$ has a different curvature. Here, the adjacent reflective portions 543-$(j-1)$ and 543-$j$ that are arranged and/or shaped differently are formed on different facets of the redirecting surface 543 of the optical extractor 540. Moreover, each of the M reflective portions 543-$j$ reflects back into the optical extractor 540 light in a segment angular range 138"-$j$, where i=1 . . . M. The light reflected in the segment angular range 138"-$j$ is transmitted into the ambient environment in a segment angular range 145"-$j$, where j=1 . . . M. The backward angular range 145" output by the optical extractor 540 is a composite angular range formed from the M segment angular ranges 145"-$j$, where j=1 . . . M. Near-field distributions of the flux or peak-intensity corresponding to all M segment angular ranges 145"-$j$, where j=1 . . . M, across the transverse dimension (e.g., along the x-axis) of the optical extractor 540, can be represented like in FIGS. 1D and 1E. A superposition of the near-field distributions of the flux or peak-intensity corresponding to all M segment angular ranges 145"-$j$ advantageously determines the shape and orientation of the backward output lobe 145$b$ of the far-field intensity distribution 101 illustrated in FIG. 1F.

In some implementations, at least a pair of adjacent transmissive portions 5455-$i$ and 5455-$(i+1)$ are arranged and/or shaped differently and at least a pair of adjacent reflective portions 543-$(j-1)$ and 543-$j$ are arranged and/or shaped differently. In this case, the pair of adjacent transmissive portions 5455-$i$ and 5455-$(i+1)$ that are arranged and/or shaped does not necessarily need to be separated by one of the adjacent reflective portions 543-$(j-1)$ and 543-$j$ that are arranged and/or shaped differently.

In this manner, the optical extractor 540 outputs, into the ambient environment, light—reflected backward by the reflecting portions 543-$j$, j=1 . . . M, of the redirecting surface 543—in one or more backward angular ranges 145" and 145'. Additionally, the light transmitted forward through the transmissive portions 5455-$i$, $i=1 \ldots N$, of the redirecting surface 543 is output by the optical extractor 540 within a forward output angular range 145'". Here, propagation directions of the light in the backward angular ranges 145', 145" have components that are antiparallel to the forward direction (e.g., the z-axis) and a propagation direction of the light in the forward angular range 145'" has a component parallel to the forward direction. Moreover, the propagation directions of the light in the backward angular ranges 145' and 145" have respective components orthogonal to the forward direction that are opposite (antiparallel) to each other (antiparallel and parallel to the x-axis.)

An important aspect of the structured redirecting surface 543 is that it can be configured to manipulate the visible luminance of the optical extractor 540 in the field of view by directing some parts of the emission away from direct fields of view. This ability to discretize the emission from the optical extractor 540 can enable even greater control of the luminous intensity (e.g., shown in FIGS. 1D-1E) and far field luminous intensity (e.g., shown in FIG. 1F) of the illumination device 500. At least some of the transmissive portions 5455-$i$, $i=1 \ldots N$, of the redirecting surface 543 can be arranged and shaped to transmit light to a region below the optical extractor 540 in a manner which may be useful for task illumination, for example. Further, at least some of the transmissive portions 5455-$i$, $i=1 \ldots N$, arranged and shaped to output light for task illumination can be further structured, e.g., with precise diffusing properties, to further customize the segment angular range 145'"-$i$ associated with the structured transmissive surfaces.

The preceding FIGs. and accompanying description illustrate example methods, systems and devices for illumination. It will be understood that these methods, systems, and devices are for illustration purposes only and that the described or similar techniques may be performed at any appropriate time, including concurrently, individually, or in combination. In addition, many of the steps in these processes may take place simultaneously, concurrently, and/or in different orders than as shown. Moreover, the described methods/devices may use additional steps/parts, fewer steps/parts, and/or different steps/parts, as long as the methods/devices remain appropriate.

In other words, although this disclosure has been described in terms of certain aspects or implementations and generally associated methods, alterations and permutations of these aspects or implementations will be apparent to those skilled in the art. Accordingly, the above description of example implementations does not define or constrain this disclosure. Further implementations are described in the following claims.

What is claimed is:

1. An illumination device comprising:
   a light-emitting element (LEE);
   an optical coupler extending between an input aperture and an exit aperture, the optical coupler configured to collimate light received at the input aperture and output collimated light along a forward direction having a first divergence at the exit aperture, the input aperture positioned to receive light emitted from the LEE; and
   an optical extractor spaced apart from the exit aperture of the optical coupler at a first distance, the optical extractor having a redirecting surface configured to reflect a first portion of the collimated light, the reflected light being output along obtuse angles relative to the forward direction, the redirecting surface further configured to transmit a second portion of the collimated light and the optical extractor configured to output forward light along acute angles relative to the forward direction,
   wherein a combination of the first divergence, the first distance and a shape of the redirecting surface is configured such that the reflected light illuminates a portion of a first planar surface perpendicular to the forward direction and the forward light illuminates a portion of a second planar surface parallel to the first surface.

2. The illumination device of claim 1, wherein the redirecting surface is a first redirecting surface and the optical extractor comprises a solid transparent material and a second redirecting surface different from the first redirecting surface, the second redirecting surface reflecting some of the transmitted light and outputting the forward light; and
   wherein a combination of the first divergence, the first distance, the shape of the first redirecting surface and a shape of the second redirecting surface is configured such that the reflected light illuminates a portion of a first planar surface perpendicular to the forward direction and the forward light illuminates a portion of a second planar surface parallel to the first surface.

3. The illumination device of claim 2, wherein the second redirecting surface comprises a reflective metal coating.

4. The illumination device of claim 2, wherein the second reflective surface comprises portions that reflect some of the transmitted light via total internal reflection.

5. The illumination device of claim 2, wherein the first reflective surface comprises one or more portions that output at least some of the light reflected by the second redirecting surface along obtuse angles relative to the forward direction.

6. The illumination device of claim 1, wherein the coupler comprises a hollow body having an inward-facing reflective side surface extending between the input aperture and the exit aperture and is configured to collimate the received light via specular reflection at the side surface.

7. The illumination device of claim 1, wherein the redirecting surface is a diffuse reflecting and diffuse transmitting surface.

8. The illumination device of claim 1, further comprising multiple LEEs and multiple couplers having exit apertures arranged along a path in a plane perpendicular to the forward direction and the optical extractor has a length extending along the path and has a width perpendicular to the length that is narrower than the length.

9. The illumination device of claim 1, wherein the redirecting surface comprises a reflective metal coating.

10. The illumination device of claim 9, wherein the redirecting surface further comprises multiple transmissive portions configured to transmit the transmitted light.

11. The illumination device of claim 10, further comprising multiple optical elements, each optically coupled to a corresponding transmissive portion and configured to modify the light transmitted through the transmissive portion such that a property of the output light is different from a property of the collimated light; wherein the property is selected from a group comprising spectral power distribution and divergence.

12. The illumination device of claim 11, wherein the optical elements comprise elastic scattering elements.

13. The illumination device of claim 11, wherein the optical elements comprise refractive lenses.

14. The illumination device of claim 1, wherein the LEEs are pump LEEs and the extractor comprises a phosphor.

15. The illumination device of claim 1, wherein the reflective surface comprises steps.

16. The illumination device of claim 1, wherein the optical extractor has axial symmetry about the forward direction.

17. The illumination device of claim 16, wherein the optical extractor has a circular extension around the forward direction.

18. The illumination device of claim 1, further comprising a light guide having a first end and a second end, the light guide arranged to receive light from the optical coupler at the first end and guide the received light to the second end, and the optical extractor is arranged to receive light from the second end of the light guide.

* * * * *